United States Patent
Inoue et al.

(10) Patent No.: US 6,240,514 B1
(45) Date of Patent: May 29, 2001

(54) PACKET PROCESSING DEVICE AND MOBILE COMPUTER WITH REDUCED PACKET PROCESSING OVERHEAD

(75) Inventors: Atsushi Inoue, Kanagawa; Masahiro Ishiyama, Tokyo; Atsushi Fukumoto; Yoshiyuki Tsuda, both of Kanagawa; Atsushi Shimbo; Toshio Okamoto, both of Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/954,631

(22) Filed: Oct. 20, 1997

(30) Foreign Application Priority Data

Oct. 18, 1996 (JP) .................................................... 8-276186
Sep. 1, 1997 (JP) .................................................... 9-236045

(51) Int. Cl.[7] ................................. H04L 9/00; H04B 7/26
(52) U.S. Cl. ........................... 713/153; 713/160; 713/162; 380/248
(58) Field of Search ................................. 380/21, 47, 23, 380/272, 281, 284, 247, 248; 370/85.13; 713/151–154, 160–162; 455/410, 411

(56) References Cited

PUBLICATIONS

Atkinson, R. IP Encapsulating Security Payload (ESP) (RFC1827). Naval Research Laboratory. Aug. 1995. pp. 1–11.*

Atkinson, R. Security Architecture for the Internet Protocol (RFC1825). Naval Research Laboratory. Aug. 1995. pp. 1–20.*

* cited by examiner

Primary Examiner—Gilberto Barron, Jr.
(74) Attorney, Agent, or Firm—Foley & Lardner

(57) ABSTRACT

A packet processing and packet transfer scheme capable of reducing the packet processing overhead by eliminating a need to decrypt and re-encrypt the entire packet at a time of relaying encrypted packets. In a packet processing device for relaying encrypted packets, a packet transferred to the packet processing device is received, where the packet has a packet processing key to be used in a prescribed packet processing with respect to a data portion of the packet, and the packet processing key is encrypted by using a first master key shared between a last device that applied a cipher communication related processing to the packet and the packet processing device. Then, the packet processing key in the received packet is decrypted, without carrying out the prescribed packet processing with respect to the data portion of the packet, and the decrypted packet processing key is re-encrypted by using a second master key shared between a next device to apply the cipher communication related processing to the packet and the packet processing device. Then, the packet with the re-encrypted packet processing key encoded therein is transmitted toward a destination of the received packet.

25 Claims, 15 Drawing Sheets

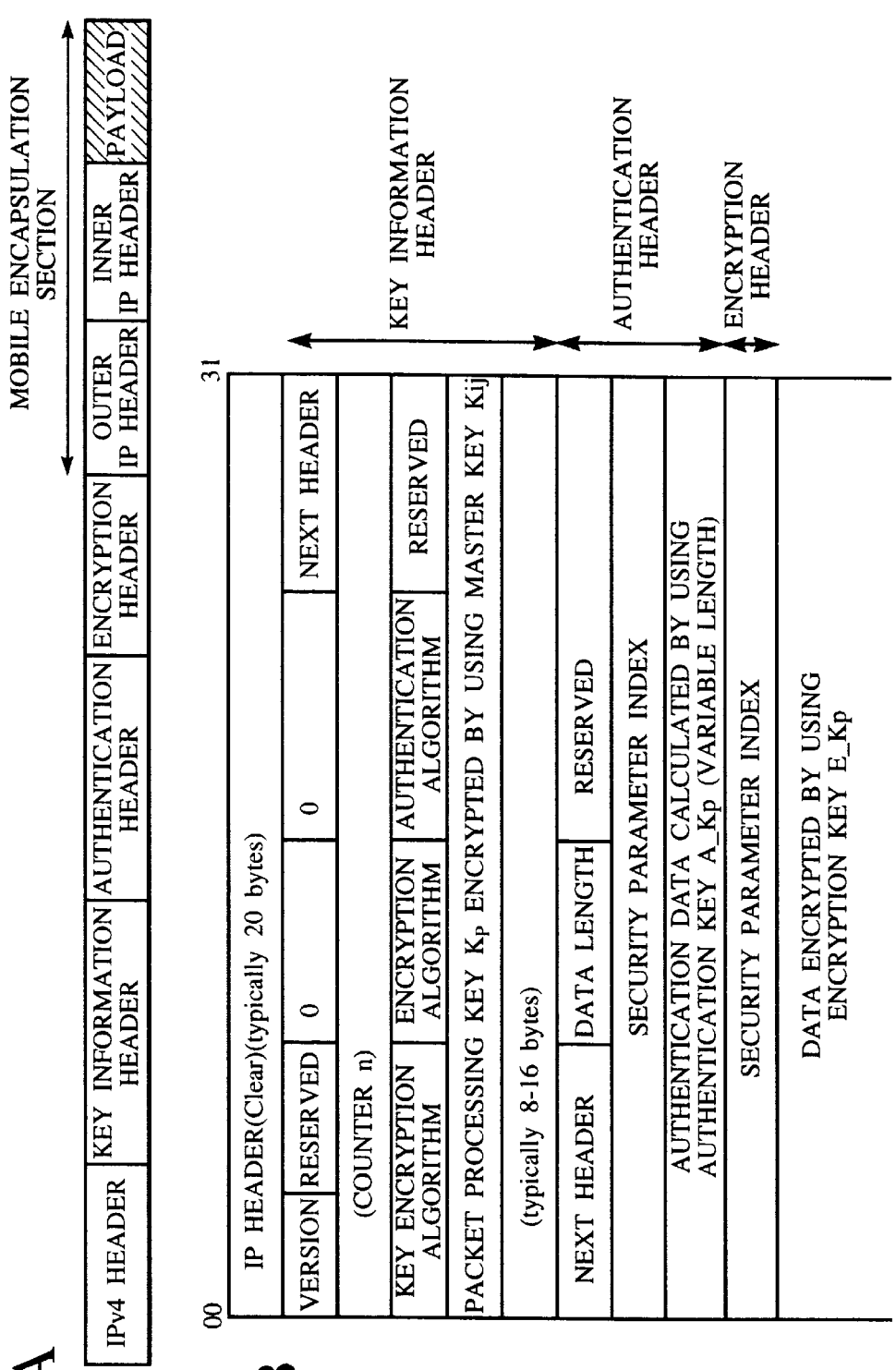

PACKET PROCESSING DEVICE AND MOBILE COMPUTER WITH REDUCED PACKET PROCESSING OVERHEAD

BACKGROUND OF THE INVENTION

1. Field of the Invention

The present invention relates to a packet processing device for transferring packets to a mobile computer and a mobile computer capable of carrying out cipher communications while moving among inter-connected networks, as well as a packet transfer method and a packet processing method suitable for a mobile computing.

2. Description of the Background Art

In conjunction with availability of a computer system in smaller size and lower cost and a more enriched network environment, the use of computer system has been rapidly expanded into variety of fields, and there is also a transition from a centralized system to a distributed system. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with outside of an office or organization, and these communications are now widely used. In particular, in recent years, the use of the world's largest computer network called Internet has become very popular, and there are new computer businesses for connecting to the Internet and utilizing open information and services, or for providing information and services to external users who make accesses through the Internet. In addition, new technological developments are made in relation to the use of the Internet.

Also, in conjunction with the spread of such networks, there are technological developments regarding the mobile computing. In the mobile computing, a user carries along a portable computer terminal and makes communications while moving over networks. In some cases, the user may change a location on a network while continuing the communication, so that there is a need for a scheme that manages a changing address of a mobile computer on a network during such a communication in order to route the communication content correctly.

Also, when the networks are wide spread and free connections among networks are realized so that huge amount of data and services can be exchanged, there arises a need to account for the problem of security. For example, there is a problem as to how to prevent the leakage of the secret information of the organization to the external network, and there is also a problem as to how to protect resources and information connected to the domestic network. The Internet was developed originally for the academic purpose so that the primary concern was the free data and service exchanges by the network connections and the above described problem of security has not been accounted for. However, in recent years, many corporations and organizations are connecting to the Internet so that there is a need for a mechanism to guard the own network in view of the above described problem of security.

To this end, there is a known scheme for use at a time of exchanging a data packet on the Internet, in which the content of the data packet is to be encrypted and an authentication code is to be attached before the transmission of the data packet to the external, and the authentication code is to be verified and the data packet is to be decrypted at a received site. According to this scheme, even when an outsider picks up the data packet on the external network, the leakage of data content can be prevented because the data content is encrypted, and therefore the safe communication can be realized.

A mutual cipher communication is possible between networks which are protected (guarded) by gateway computers that support such a cipher communication, and when the above described mobile computer itself supports a function of the packet encryption and decryption, a cipher communication between any gateways or a gateway and a mobile computer can be supported. For example, in an exemplary case shown in FIG. 1, a mobile computer 2 that originally belongs to a home network 1a moves to another network 1b and carries out a cipher communication with another computer (correspondent host) 3 in a network 1c, through gateways 4a and 4c that support the encryption/decryption function.

In general, in a case of realizing the mobile computing, a router (home agent) for managing data on a visiting site of the mobile computer is provided, and the transmission of data destined to the mobile computer is realized by sending it via the home agent of the mobile computer, so as to carry out the data routing control with respect to the mobile computer. In FIG. 1, this role is played by a home agent (HA) 5.

A packet transfer route in FIG. 1 will be as follows: correspondent host 3 → gateway 4c → gateway 4a → home agent (HA) 5 → gateway 4a → mobile computer 2. In a case where the decryption is to be carried out by a gateway of the network 1b, the transfer route will be as follows: correspondent host 3 → gateway 4c → gateway 4a → home agent (HA) 5 → gateway 4a → a gateway of the network 1b → mobile computer 2.

In either case, the packet is decrypted once at the gateway 4a, sent to the home agent 5, sent back to the gateway 4a, and encrypted at the gateway 4a. In other words, the gateway 4a is going to carry out the encryption processing twice with respect to the entire packet (a data portion of the packet).

In general, the encryption/decryption of a data packet is a processing that requires a very large amount of calculations, and the above described packet sequence is quite redundant. In particular, in a case of supporting many mobile computers, this redundancy can cause a considerable lowering of the throughput in the entire system.

The similar problem also exists for a device such as a router for relaying encrypted packets, in a case where a received packet is to be decrypted, encrypted, and then relayed.

On the other hand, in a system that realizes the packet transfer to a mobile computer by using the encapsulation and the security measure by using the packet encryption, when a mobility processing and an encryption processing with respect to a packet are carried out in arbitrary order depending on a positional relationship among the elements constituting the system, it has been impossible to recover the original content correctly at a mobile computer that receives the packet. In this case, it has also been impossible to carry out a packet transfer processing correctly at a packet processing device for transferring a packet to the mobile computer that is located on a side where the mobile computer is located.

As described, in the mobile computing, a packet destined to a mobile computer is transferred via a host that manages data on a visited site of the mobile computer. In a case where the mobile computer carries out communications that require packet encryption/decryption with a correspondent host through gateways of respective networks, a data packet destined to a mobile computer reaches to a home agent after being decrypted once at an encryption gateway of a home network, transmitted from a home agent after a current location of the mobile computer is searched, and then transmitted toward the mobile computer after being encrypted again at the encryption gateway of the home network. Consequently, the decryption and the encryption are going to be carried out twice in total, which is redundant and potentially a cause of the bottleneck in the entire system. The similar problem also exists for a device such as a router for relaying encrypted packets, in a case where a received packet is to be decrypted, encrypted, and then relayed.

On the other hand, in a system that realizes the packet transfer to a mobile computer by using the encapsulation and the security measure by using the packet encryption, when a mobility processing and an encryption processing with respect to a packet are carried out in arbitrary order depending on a positional relationship among the elements constituting the system, it has been impossible to carry out the packet processing correctly at a mobile computer that receives the packet and a packet processing device for transferring a packet to the mobile computer.

SUMMARY OF THE INVENTION

It is therefore an object of the present invention to provide a packet processing device and a packet transfer method which are capable of reducing the packet processing overhead by eliminating a need to decrypt and re-encrypt the entire packet at a packet processing device for relaying encrypted packets.

It is another object of the present invention to provide a packet processing device and a packet transfer method capable of reducing the packet processing overhead by eliminating a need to decrypt and re-encrypt the entire packet destined to a mobile computer at a packet processing device of a home network, in a communication system in which the cipher communication is to be carried out for a packet destined to the mobile computer through a home agent that manages a location information of the mobile computer and the encrypted packet destined to the mobile computer is to be processed at the packet processing device of the home network.

It is another object of the present invention to provide a mobile computer and a packet processing method capable of recovering a content of a packet correctly even when the encapsulation processing using a visited location address and the encryption processing for the mobile computer are carried out in an arbitrary order.

It is another object of the present invention to provide a packet processing device and a packet processing method capable of transferring a packet to the mobile computer correctly even when the encapsulation processing using a visited location address and the encryption processing for the mobile computer are carried out in an arbitrary order.

According to one aspect of the present invention there is provided a packet processing device for relaying encrypted packets, comprising: a receiving unit for receiving a packet transferred to said packet processing device, the packet having a packet processing key to be used in a prescribed packet processing with respect to a data portion of the packet, the packet processing key being encrypted by using a first master key shared between a last device that applied a cipher communication related processing to the packet and said packet processing device and encoded within the packet; a decryption unit for decrypting the packet processing key encoded within the packet received by the receiving unit, without carrying out the prescribed packet processing with respect to the data portion of the packet; an encryption unit for re-encrypting the packet processing key decrypted by the decryption unit, by using a second master key shared between a next device to apply the cipher communication related processing to the packet and said packet processing device, and encoding the packet processing key in a re-encrypted form within the packet; and a transmission unit for transmitting the packet with the packet processing key encoded therein by the encryption unit, toward a destination of the packet.

According to another aspect of the present invention there is provided a mobile computer for carrying out communications while moving among inter-connected networks, comprising: a judging unit for judging an outermost packet format of a received packet; and a packet processing unit for executing a decapsulation processing and a decryption processing with respect to the received packet in an order determined according to the outermost packet format judged by the judging unit.

According to another aspect of the present invention there is provided a packet processing device for transferring a packet received from one computer located outside an own network managed by said packet processing device to another computer located inside the own network, comprising: a judging unit for judging an outermost packet format of a received packet; and a packet processing unit for executing a decapsulation processing and a decryption processing with respect to the received packet in an order determined according to the outermost packet format judged by the judging unit.

According to another aspect of the present invention there is provided a packet processing device for transferring a packet received from one computer located outside an own network managed by said packet processing device to another computer located inside the own network, comprising: a judging unit for judging an outermost packet format of a received encapsulated and encrypted packet; and a packet processing unit for executing a decapsulation processing on the received encapsulated and encrypted packet and transferring a resulting encrypted packet to said another computer when the judging unit judges that the outermost packet format is an encapsulation format, or transferring the received encapsulated and encrypted packet to said another computer when the judging unit judges that the outermost packet format is an encryption format.

According to another aspect of the present invention there is provided a packet transfer method for relaying encrypted packets at a packet processing device, comprising the steps of: receiving a packet transferred to said packet processing device, the packet having a packet processing key to be used in a prescribed packet processing with respect to a data portion of the packet, the packet processing key being encrypted by using a first master key shared between a last device that applied a cipher communication related processing to the packet and said packet processing device and encoded within the packet; decrypting the packet processing key encoded within the packet received by the receiving step, without carrying out the prescribed packet processing with respect to the data portion of the packet; re-encrypting the packet processing key decrypted by the decrypting step, by using a second master key shared between a next device to apply the cipher communication related processing to the packet and said packet processing device, and encoding the packet processing key in a re-encrypted form within the packet; and transmitting the packet with the packet processing key encoded therein by the re-encrypting step, toward a destination of the packet.

According to another aspect of the present invention there is provided a packet processing method for processing a received packet at a mobile computer for carrying out communications while moving among inter-connected networks, comprising the steps of: judging an outermost packet format of the received packet; and executing a decapsulation processing and a decryption processing with respect to the received packet in an order determined according to the outermost packet format judged by the judging step.

According to another aspect of the present invention there is provided a packet processing method for processing a received packet at a packet processing device for transferring a packet received from one computer located outside an own network managed by said packet processing device to another computer located inside the own network, comprising the steps of: judging an outermost packet format of the received packet; and executing a decapsulation processing and a decryption processing with respect to the received packet in an order determined according to the outermost packet format judged by the judging step.

According to another aspect of the present invention there is provided a packet transfer method for transferring a received packet at packet processing device for transferring a packet received from one computer located outside an own network managed by said packet processing device to another computer located inside the own network, comprising the steps of: judging an outermost packet format of a received encapsulated and encrypted packet; and executing a decapsulation processing on the received encapsulated and encrypted packet and transferring a resulting encrypted packet to said another computer when the judging step judges that the outermost packet format is an encapsulation format, or transferring the received encapsulated and encrypted packet to said another computer when the judging step judges that the outermost packet format is an encryption format.

According to another aspect of the present invention there is provided an article of manufacture, comprising: a computer usable medium having computer readable program code means embodied therein for causing a computer to function as a packet processing device for relaying encrypted packets, the computer readable program code means including: first computer readable program code means for causing said computer to receive a packet transferred to said packet processing device, the packet having a packet processing key to be used in a prescribed packet processing with respect to a data portion of the packet, the packet processing key being encrypted by using a first master key shared between a last device that applied a cipher communication related processing to the packet and said packet processing device and encoded within the packet; second computer readable program code means for causing said computer to decrypt the packet processing key encoded within the packet received by the first computer readable program code means, without carrying out the prescribed packet processing with respect to the data portion of the packet; third computer readable program code means for causing said computer to re-encrypt the packet processing key decrypted by the second computer readable program code means, by using a second master key shared between a next device to apply the cipher communication related processing to the packet and said packet processing device, and encode the packet processing key in a re-encrypted form within the packet; and fourth computer readable program code means for causing said computer to transmit the packet with the packet processing key encoded therein by the third computer readable program code means, toward a destination of the packet.

According to another aspect of the present invention there is provided an article of manufacture, comprising: a computer usable medium having computer readable program code means embodied therein for causing a computer to function as a mobile computer for carrying out communications while moving among inter-connected networks, the computer readable program code means including: first computer readable program code means for causing said computer to judge an outermost packet format of a received packet; and second computer readable program code means for causing said computer to execute a decapsulation processing and a decryption processing with respect to the received packet in an order determined according to the outermost packet format judged by the first computer readable program code means.

According to another aspect of the present invention there is provided an article of manufacture, comprising: a computer usable medium having computer readable program code means embodied therein for causing a computer to function as a packet processing device for transferring a packet received from one computer located outside an own network managed by said packet processing device to another computer located inside the own network, the computer readable program code means including: first computer readable program code means for causing said computer to judge an outermost packet format of a received packet; and second computer readable program code means for causing said computer to execute a decapsulation processing and a decryption processing with respect to the received packet in an order determined according to the outermost packet format judged by the first computer readable program code means.

According to another aspect of the present invention there is provided an article of manufacture, comprising: a computer usable medium having computer readable program code means embodied therein for causing a computer to function as a packet processing device for transferring a packet received from one computer located outside an own network managed by said packet processing device to another computer located inside the own network, the computer readable program code means including: first computer readable program code means for causing said computer to judge an outermost packet format of a received encapsulated and encrypted packet; and second computer readable program code means for causing said computer to execute a decapsulation processing on the received encapsulated and encrypted packet and transfer a resulting encrypted packet to said another computer when the first computer readable program code means judges that the outermost packet format is an encapsulation format, or transfer the received encapsulated and encrypted packet to said another computer when the first computer readable program code means judges that the outermost packet format is an encryption format.

Other features and advantages of the present invention will become apparent from the following description taken in conjunction with the accompanying drawings.

BRIEF DESCRIPTION OF THE DRAWINGS

FIGS. 10A and 10B are diagrams showing an exemplary data packet format that can be used in a network system according to the third embodiment of the present invention.

DETAILED DESCRIPTION OF THE PREFERRED EMBODIMENTS

Referring now to FIG. 2 to FIG. 8, the first embodiment of the present invention will be described in detail.

Figure 2:
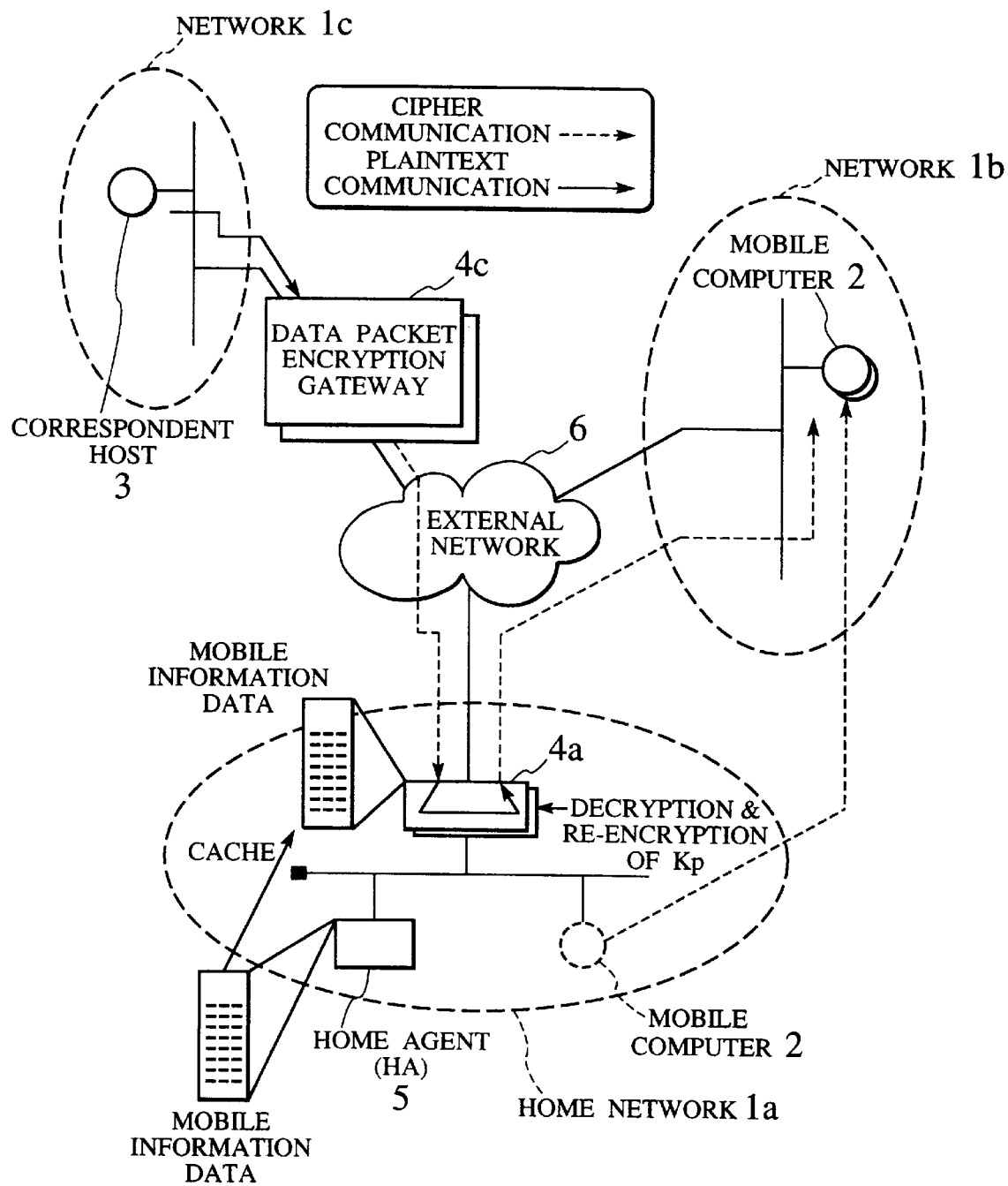
FIG. 2 is a block diagram showing an exemplary configuration of a network system according to the first embodiment of the present invention.

FIG. 2 shows a basic configuration of a network system according to this first embodiment.

This first embodiment is directed to a case where a home network 1a and external networks 1b and 1c are interconnected through the Internet 6.

The networks 1a and 1c are provided with data packet encryption gateways 4a and 4c, respectively, for the purpose of carrying out cipher communications between computers managed by these networks 1a and 1c. In addition, in this first embodiment, a mobile computer 2 also has a packet encryption function similar to the data packet encryption gateways 4a and 4c. The cipher communications are to be carried out among these data packet encryption gateways 4a and 4c and the mobile computer 2.

Here, the mobile computer 2 which has a prescribed location within the network 1a as a home position is assumed to be currently located in the network 1b as a result of moving. Also, a correspondent host 3 that carries out the cipher communications with the mobile computer 2 is assumed to be located in the network 1c.

A home agent (HA) 5 within the home network 1a carries out the management of a location information of the mobile computer 2 and the routing of a packet destined to the mobile computer 2. When the mobile computer 2 moves to a remote visited site by leaving the home network 1a, a registration message containing a location information of the visited site (as well as a valid period of the location information if necessary) is sent to the home agent 5.

According to this information, when a packet destined to the mobile computer 2 arrives at the home network 1a, the home agent 5 receives this packet, formats (encapsulates) the entire packet into a data packet having a current location indicated by a mobile information as a destination, and transmits this data packet. The mobile computer 2 then receives transmitted data by receiving and decapsulating this data packet.

Note that there are cases in which sub-networks are hierarchically connected within the home network 1a through routers that do not carry out the processing related to the cipher communications, and in such a case, a home agent is to be provided at each sub-network. In this case, when a mobile computer moves from its home position to another sub-network connected through routers, this mobile computer can be handled as not corresponding to a case of moving outside the home network 1a.

There are also cases in which sub-networks are hierarchically connected within the home network 1a through data packet encryption gateways. In this case, when a mobile computer moves from its home position to another sub-network connected through data packet encryption gateways, this mobile computer can be handled as corresponding to a case of moving outside the home network 1a.

Figure 1:
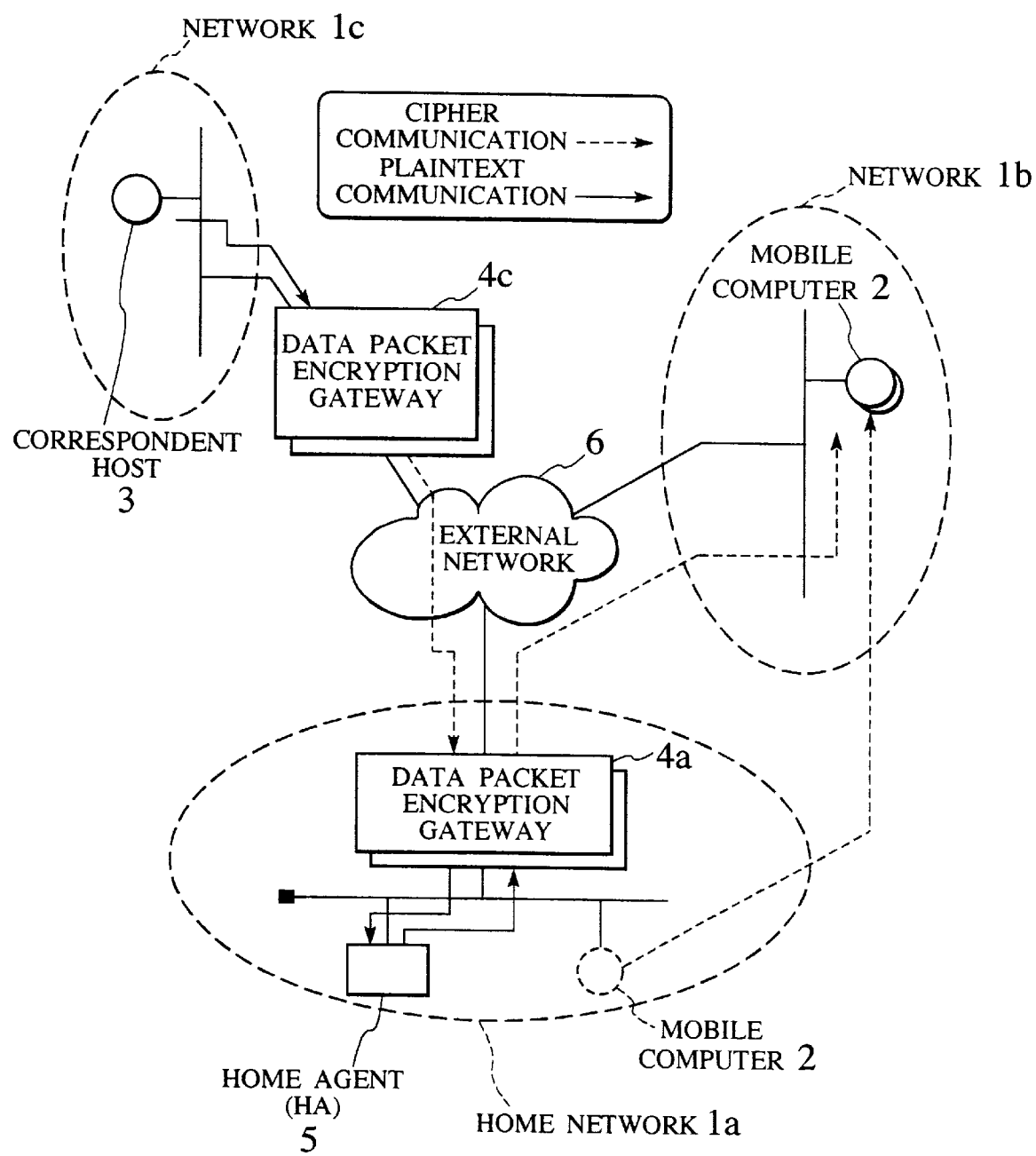
FIG. 1 is a block diagram showing a basic configuration of a communication system supporting a mobile computing using cipher communications.

Now, according to this mobile computing policy, a communication will be carried out conventionally as shown in FIG. 1 described above, in such a manner that the cipher communication is carried out between the data packet encryption gateways 4c and 4a, and a packet with its encrypted data portion decrypted by the data packet encryption gateway 4a is sent to the home agent 5, encapsulated there, and then encrypted again by the gateway 4a. Then, the cipher communication between the gateway 4a and the mobile computer 2 is to be carried out. Namely, the gateway 4a has been required to carry out the processing that requires a large processing cost twice, that is, the encryption once and the decryption once, with respect to the data portion of the packet.

In contrast, in this first embodiment, the processing cost conventionally required by the decryption and re-encryption at the data packet encryption gateway 4a is considerably reduced by the scheme which will be described now.

In the following, the processing at the data packet encryption gateway 4a and the packet format used in carrying out the cipher communication according to this first embodiment will be described in detail.

Figure 3:
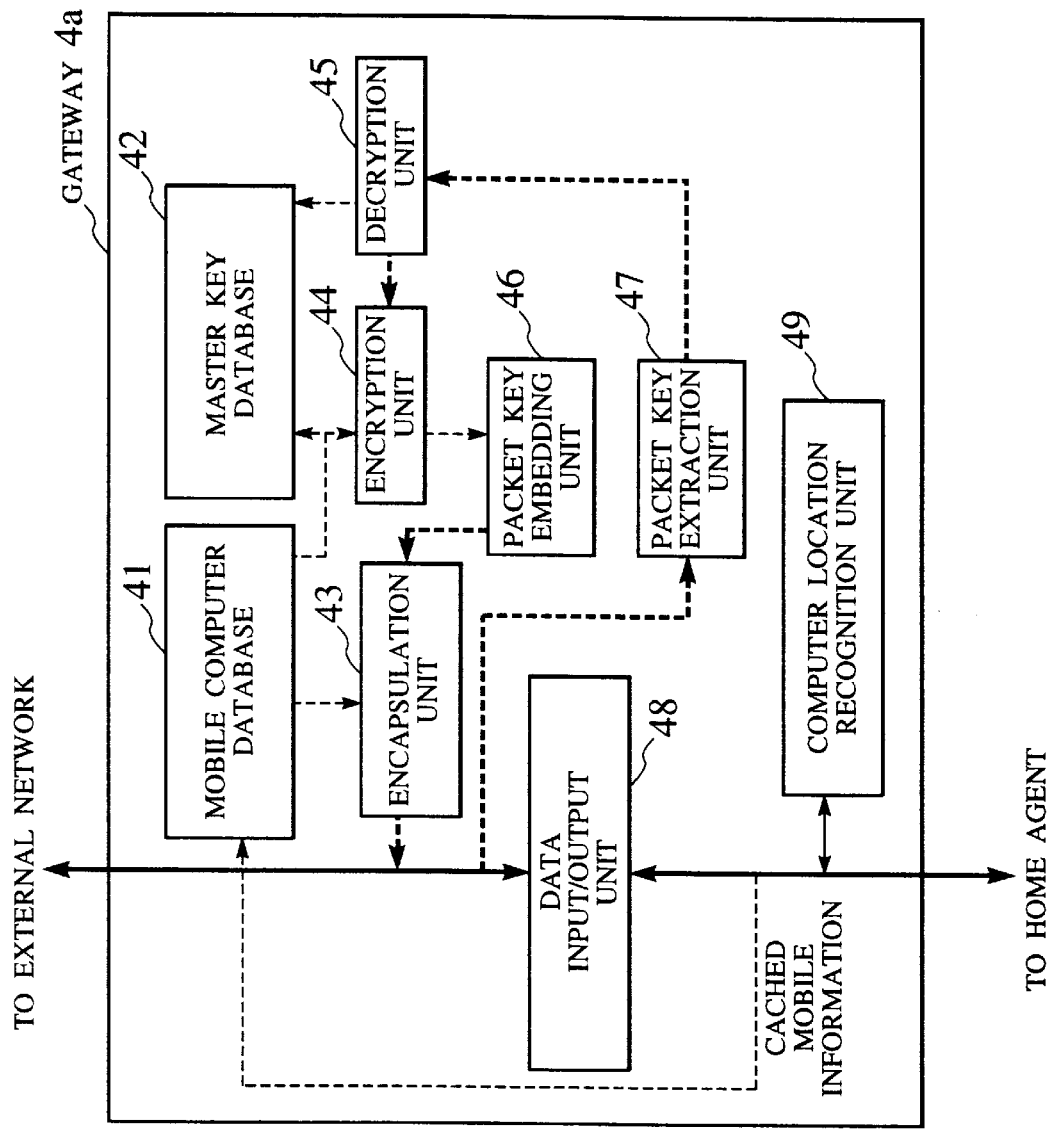
FIG. 3 is a block diagram showing an exemplary internal configuration of a data packet encryption gateway in the network system of FIG. 2.

Here, the gateway 4a has an exemplary internal configuration as shown in FIG. 3, which comprises a mobile computer database 41, a master key database 42, an encapsulation unit 43, an encryption unit 44, a decryption unit 45, a packet key embedding unit 46, a packet key extraction unit 47, a data input/output unit 48, and a computer location recognition unit 49. The functions of these elements of the gateway 4a will be described in conjunction with the processing of the gateway 4a below.

Figure 4A:
FIGS. 4A and 4B are diagrams showing an exemplary data packet format that can be used in the network system of FIG. 2.
Figure 4B:
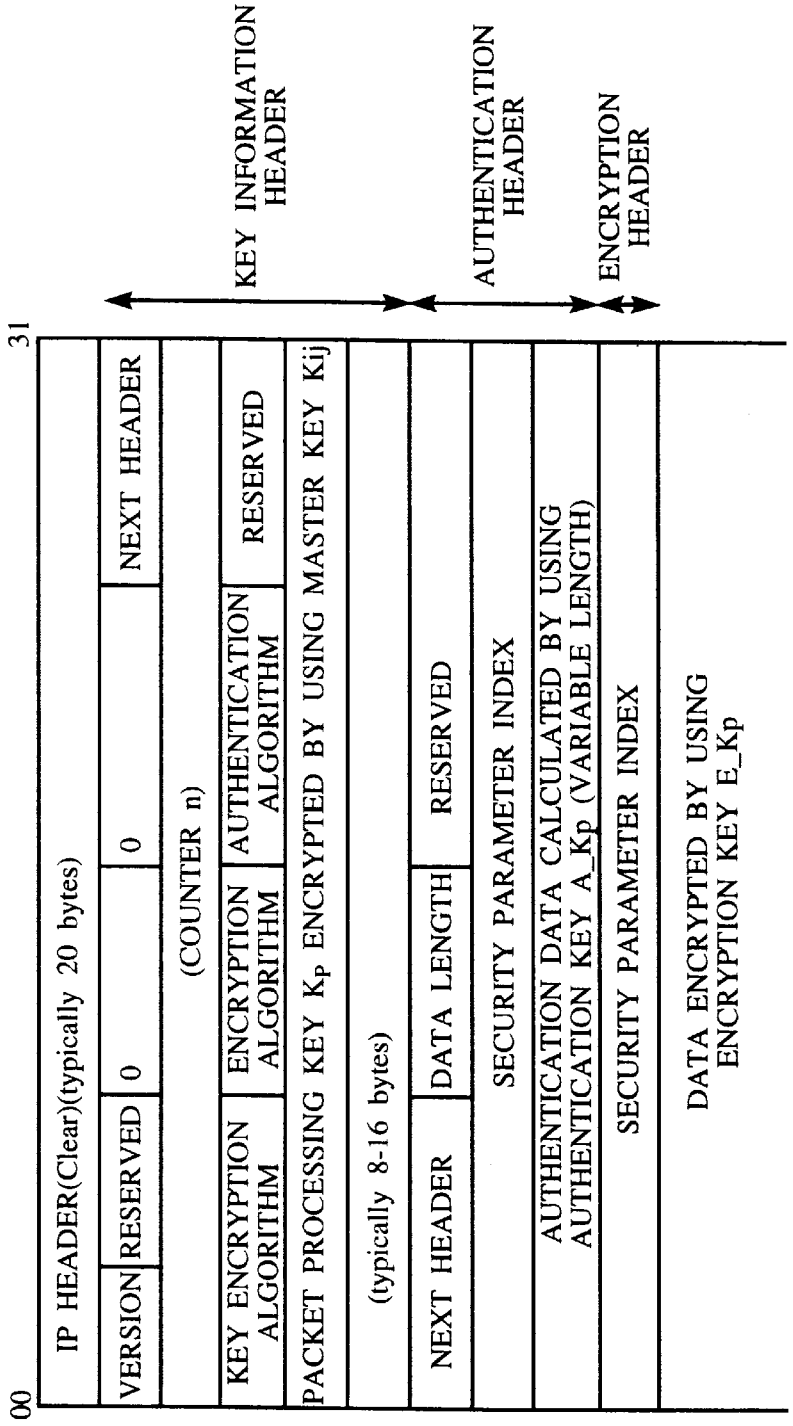

FIGS. 4A and 4B show an exemplary packet format to be used in carrying out the cipher communication. Here, as shown in FIGS. 4A and 4B, a packet comprises a usual IP header (IPv4 header) followed by a key information header, an authentication header, an encryption header, and an encrypted data portion (internal protocols).

The IP header contains an address of a device which encrypted this packet and an address of a device which should decrypt this packet.

The key information header contains information for specifying a key encryption algorithm, a packet encryption algorithm, and an authentication algorithm, as well as a packet processing key Kp encrypted by a master key Kij to be shared between two data packet encryption gateways (or between the data packet encryption gateway and the mobile computer). Here, the packet processing key Kp is a key which is randomly generated at the sender side, which will be used in calculating a packet authentication key A_Kp and a packet encryption key E_Kp. Note that the master key may be provided in a form of a function Kijn if a time information (indicated by a counter n).

The master key to be shared between two data packet encryption gateways or between the data packet encryption gateway and the mobile computer can be generated by the exchange of a secret key or the derivation using a public key and a secret key (such as the Diffie-Hellman method), for example. The master keys are stored in the master key database 42 in advance.

Figure 5:
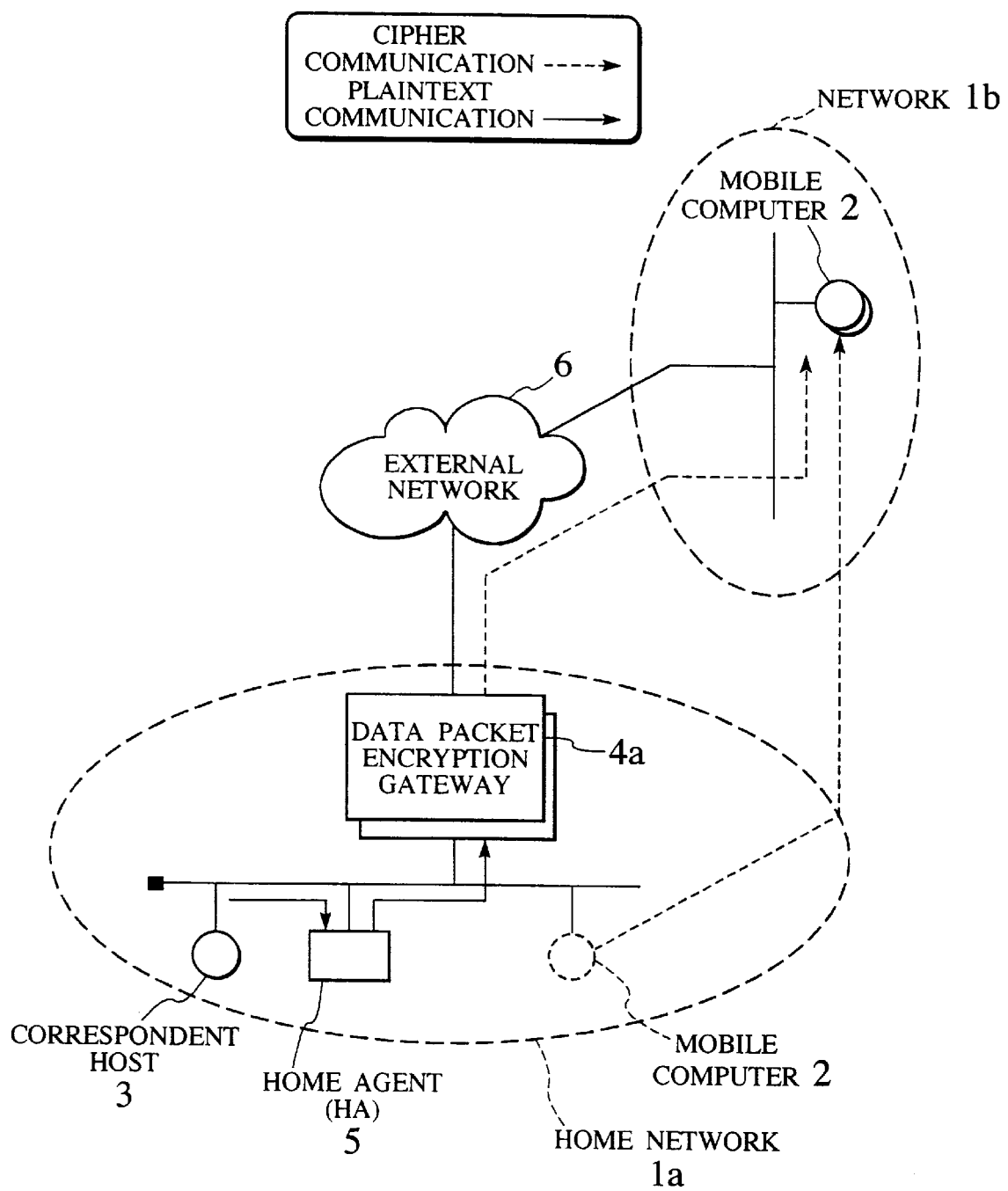
FIG. 5 is a block diagram showing the network system of FIG. 2 in a case where a correspondent host is located within the home network.
Figure 6:
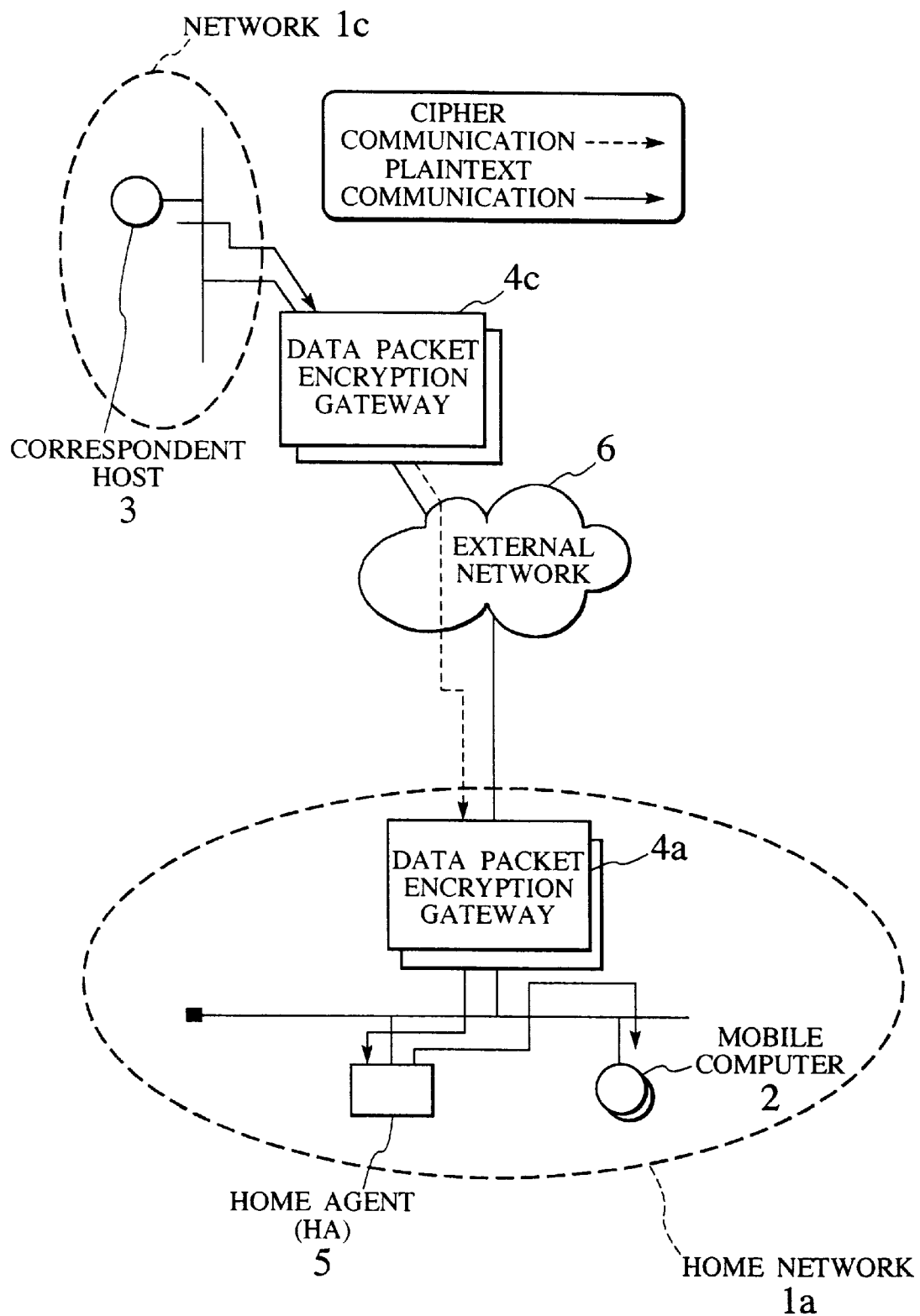
FIG. 6 is a block diagram showing the network system of FIG. 2 in a case where a mobile computer is located within the home network.

Now, in this first embodiment, the gateway 4a can carry out the decryption and the re-encryption of only the packet processing key Kp portion in a case where the mobile computer 2 and the correspondent host 3 are both outside the home network 1a. When the correspondent host 3 is located within the home network 1a as shown in FIG. 5 or when the mobile computer 2 is located within the home network 1a as shown in FIG. 6, for example, the communication from one side is not in a form of the cipher communication so that the communication must be made via the home agent 5. In cases of FIG. 5 and FIG. 6, the encryption of the data portion of the packet is carried out at the gateway 4a.

Also, in this embodiment, the encapsulation unit 43 of the gateway 4a carries out the encapsulation processing for data with respect to the mobile computer 2 which is usually carried out by the home agent 5, in addition to the decryption of the packet processing key Kp by the decryption unit 45 and the re-encryption using the master key by the encryption unit 44.

To this end, the gateway 4a has a mobile computer database 41 for storing a cached mobile information which is copied from a mobile information data maintained at the home agent 5. This function can be realized, for example, by storing a registration content into the mobile computer database 41 of the gateway 4a at a time of processing the registration message of the mobile computer 2.

Note that, instead of caching the mobile information data maintained at the home agent 5 into the gateway 4a as described above, the gateway 4a may acquire this mobile information data from the home agent 5 whenever the need arise.

In addition, in order to carry out the decryption and the re-encryption of the packet processing key Kp as well as the routing control on behalf of the home agent 5, it is necessary for the encryption gateway 4a to be capable of recognizing that both of the mobile computer 2 and the correspondent host 3 are located outside the home network 1a.

To this end, in this embodiment, the encryption gateway 4a is also provided with the computer location recognition unit 49 for recognizing whether the mobile computer 2 is located outside the home network 1a or not and whether the correspondent host 3 is located outside the home network 1a or not.

This function can be realized, for example, by providing a server device for managing a database of information indicating which gateway has packets for which computers as its processing targets (more specifically, a correspondence between a network address of each gateway and a network addresses of a group of computers which are its processing targets, for example), somewhere (which may be distributed) in the communication system, or by maintaining a database of information indicating computers whose packets are the processing targets of a gateway, within each network at which this gateway exists, in addition to the mobile computer database 41. The computer location recognition unit 49 of the gateway 4a then functions to search through these databases.

For example, the gateway 4a can recognize that the correspondent host 3 is located outside the home network 1a when a source address of a packet transmitted from the correspondent host does not match with any of the processing target addresses in the database. The gateway 4a can also recognize that the mobile computer 2 is located outside the home network 1a when a destination address of a packet transmitted from the correspondent host matches with one of the processing target addresses in the database but there is also a cached mobile information in the mobile computer database 41 which indicates that this computer is currently moving outside the home network 1a.

Figure 7:
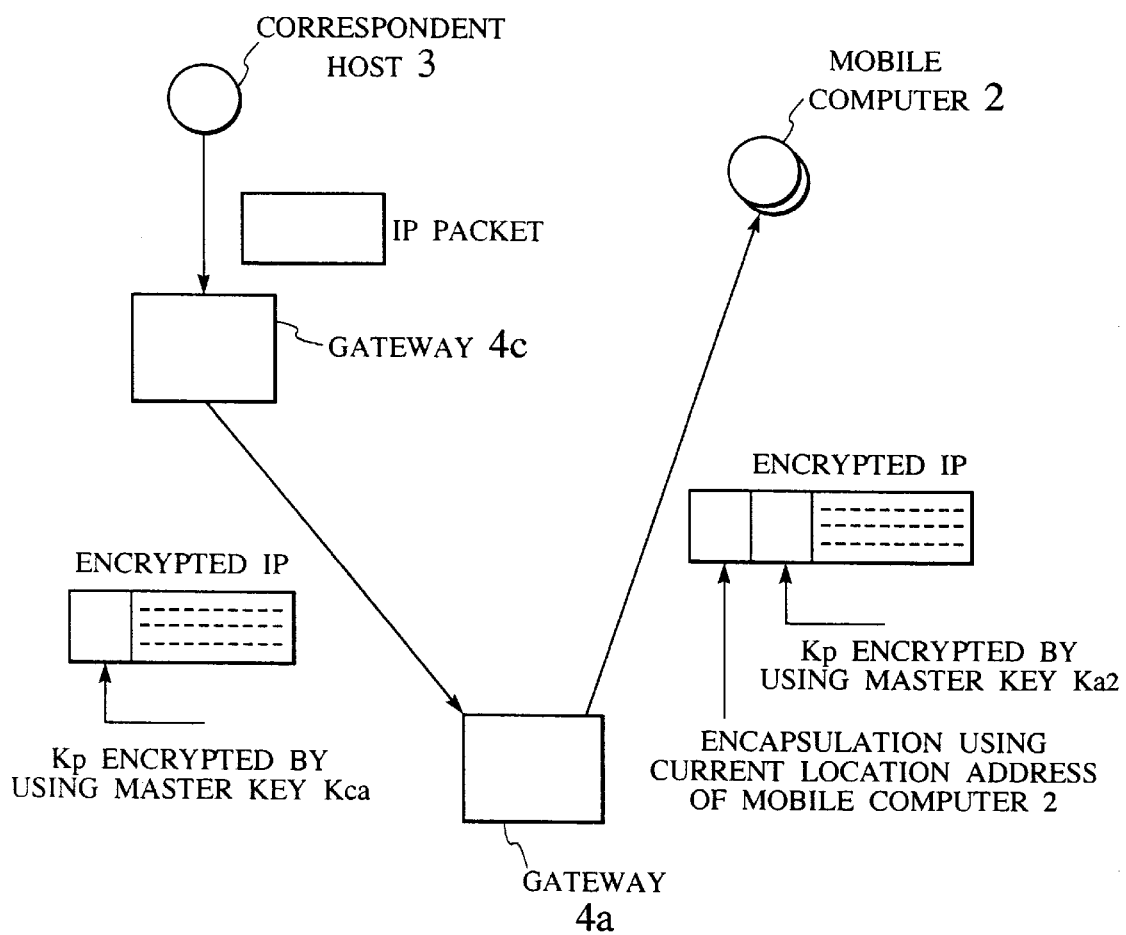
FIG. 7 is a diagram showing a flow of the data packet processing carried out at various nodes in the network system of FIG. 2.

Next, the flow of packet processing at various nodes in this embodiment is conceptually shown in FIG. 7.

First, at the correspondent host 3 which intends to communicate with the mobile computer 2, an IP packet is generated and transmitted under the assumption that the mobile computer 2 is located in the home network 1a.

This packet destined to the mobile computer 2 as transmitted by the correspondent host 3 is then transmitted from the gateway 4c, after a data portion of the packet is encrypted, the packet processing key Kp is encrypted by using the master key shared between the gateways 4a and 4c, and an authentication data is attached.

When this packet destined to the home address of the mobile computer 2 is received at the data input/output unit 48 of the data packet encryption gateway 4a of the home network 1a, the packet processing key Kp which is encrypted by using the master key shared between the gateways 4a and 4c is extracted by the packet key extraction unit 47 and decrypted by the decryption unit 45, and then re-encrypted by the encryption unit 44 and embedded into the packet by the packet key embedding unit 46, by using the master key shared between the gateway 4a and the mobile computer 2 which is stored in the master key database 42. In addition, using the cached mobile information stored in the mobile computer database 41, the datagram is encapsulated by using a current location address of the mobile computer 2 as a header, and then transmitted from the data input/output unit 48.

When this packet reaches to the mobile computer 2, the mobile computer 2 decapsulates this packet, obtains the packet authentication key and the packet encryption key by decrypting the packet processing key Kp, verifies the authentication code, and decrypts the data portion, so as to acquire the transferred data.

Note that, as described above, when the correspondent host 3 is located within the home network 1a as in FIG. 5, the data packet encryption gateway 4a carries out the encryption of the data portion of the packet, the attaching of the authentication data, and the encryption of the packet processing key.

Also, when the mobile computer 2 is located within the home network 1a as in FIG. 6, the data packet encryption gateway 4a carries out the decryption of the packet processing key, the verification of the authentication data, and the decryption of the data portion of the packet. Here, when the mobile computer 2 has moved from the home position to the other sub-network connected through routers that do not carry out the processing related to the cipher communications, the IP packet will be transferred from the data packet encryption gateway 4a to the mobile computer 2 through the home agent 5, as shown in FIG. 6. On the other hand, when the mobile computer 2 is located at the home position, the IP packet will be transferred directly from the data packet encryption gateway 4a to the mobile computer 2.

Now, as described above, in the conventional mobile computing using the encryption, in order to realize the routing via the home agent, it has been necessary for the gateway of the home network to carry out the decryption/encryption twice with respect to the data packet destined to the mobile computer. In contrast, according to this embodiment, a cache of the location management information of the home agent is provided at the gateway of the home network so that the routing control for the mobile computer is carried out at the gateway of the home network, and the packet processing key of the data packet is encoded within the packet in an encrypted form so that the packet to be transmitted to the mobile computer is reconstructed by decrypting and re-encrypting the packet processing key alone. Consequently, it becomes possible to eliminate a need to decrypt and re-encrypt the entire data packet, and therefore the overhead of the packet processing can be minimized.

Note that, in this embodiment, the final decryption is carried out by the mobile computer 2, but instead of this provision, it is also possible to carry out the final decryption at the encryption gateway existing in the visited site network 1b.

Next, a case where a certain group of networks have a hierarchical structure will be described.

Figure 8:
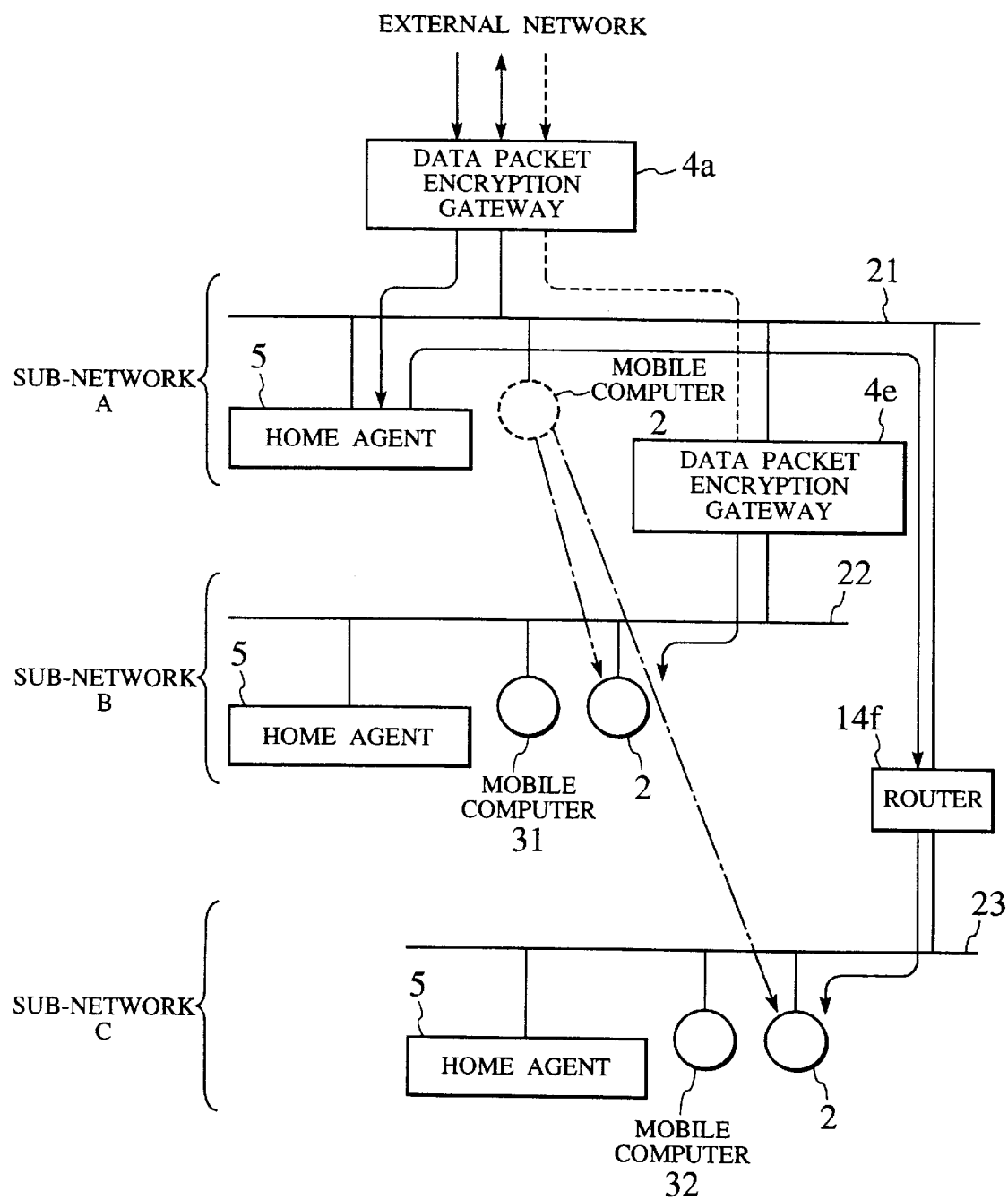
FIG. 8 is a block diagram showing a network system having a hierarchical structure according to the first embodiment of the present invention.

FIG. 8 shows an exemplary configuration of a network having the hierarchical structure. In FIG. 8, to a bus 21 which is directly connected with the data packet encryption gateway 4a, a bus 22 is connected through the data packet gateway 4e that has a function for carrying out the processing related to the cipher communications, and a bus 23 is connected through a router 14f that does not have a function for carrying out the processing related to the cipher communications, so that the sub-networks A, B and C form the hierarchical structure.

In this case, the data packet encryption gateway 4a has the sub-networks A and C as its management targets, while the data packet encryption gateway 4e has the sub-network B as its management target.

In such a configuration, when the mobile computer 2 which has the home position in the sub-network A has moved to the sub-network B, the data packet encryption gateway 4a recognizes that the mobile computer 2 has moved outside the network under its management. Consequently, in a case of transferring a packet for a communication between this mobile computer 2 and a computer (correspondent host) located in the network 1c which is connected through the external network 6 as shown in FIG. 2, the data packet encryption gateway 4a operates similarly as in a case of FIG. 2. Namely, when the data destined to the home address of the mobile computer 2 is received from the external network 6 side, the packet processing key Kp encrypted by using the master key shared between the gateways 4a and 4c is decrypted, and then re-encrypted by using the master key shared between the gateways 4a and 4e. In addition, using the cached mobile information, the datagram is encapsulated by using a current location address of the mobile computer 2 as a header and then transmitted.

On the other hand, when the mobile computer 2 which has the home position in the sub-network A has moved to the sub-network C, the data packet encryption gateway 4a recognizes that the mobile computer 2 is located within the network under its management. Consequently, in a case of transferring a packet for a communication between this mobile computer 2 and a computer (correspondent host) located in the network 1c which is connected through the external network 6 as shown in FIG. 2, the data packet encryption gateway 4a operates similarly as in a case of FIG. 6.

Figure 9A:
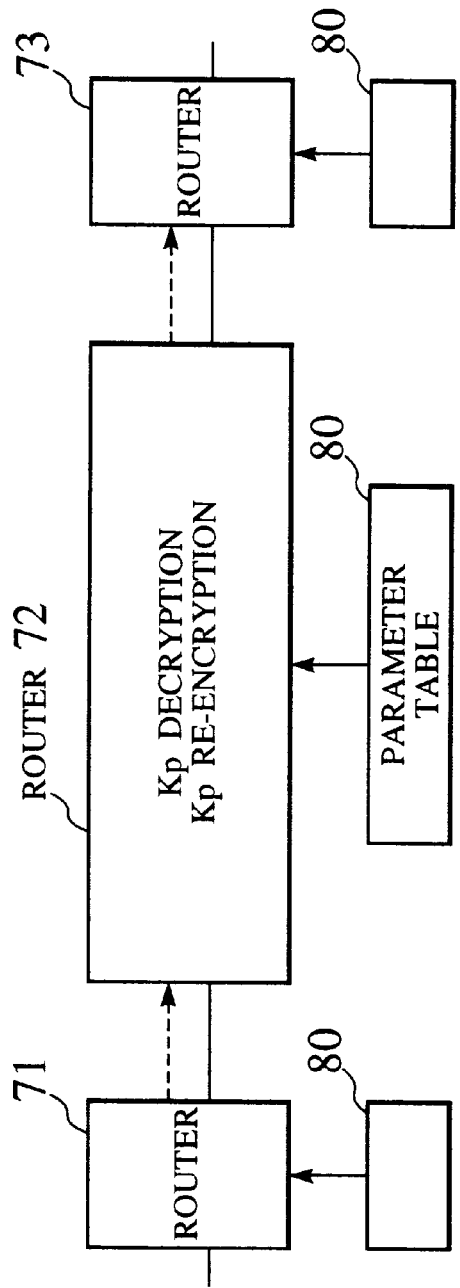
FIGS. 9A and 9B are block diagrams showing an exemplary configuration of a network system according to the second embodiment of the present invention.
Figure 9B:
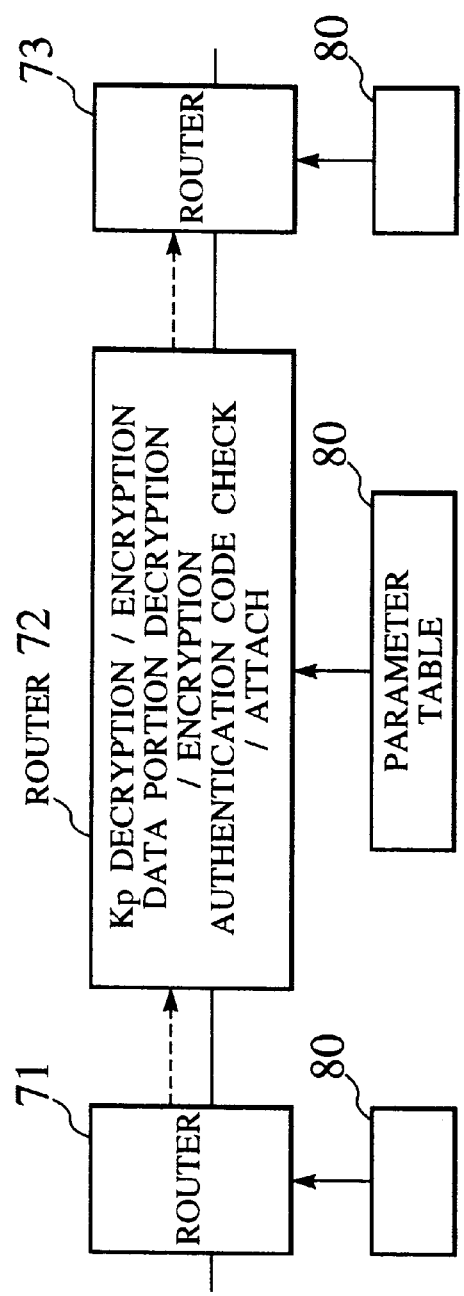

Referring now to FIGS. 9A and 9B, the second embodiment of the present invention will be described in detail.

FIGS. 9A and 9B show exemplary configurations of a communication system according to this second embodiment.

As shown in FIG. 9A, a packet transfer route is formed by security routers 71, 72 and 73 that encrypt data packets on the route. The encryption scheme of the data packet transferred on the route is determined by a negotiation between each pair of routers, and stored in a parameter table 80 of each router.

When an encrypted packet transmitted from the router 71 is received by the router 72 in a middle of the route, the router 72 refers to the parameter table 80 to check whether the data packet encryption scheme between the routers 71 and 72 is the same as the data packet encryption scheme between the routers 72 and 73.

When they are the same, the router 72 decrypts the packet processing key Kp alone by using the key encryption scheme between the routers 71 and 72, and then re-encrypts the packet processing key Kp by using the key encryption scheme between the routers 72 and 73, and transfers the resulting packet to the router 73.

In this manner, it is possible to eliminate a need to decrypt and re-encrypt the entire data packet.

On the other hand, when the data packet encryption scheme between the routers 71 and 72 and the data packet encryption scheme between the routers 72 and 73 are different (that is, when the encrypted packet transmitted from the router 71 cannot be decrypted at the router 73), as shown in FIG. 9B, it is necessary for the router 72 to decrypt and re-encrypt the entire data packet including the data portion.

Note that a case of using three routers has been described above, but the processing scheme for decrypting and re-encrypting only the packet processing key Kp according to the present invention is equally applicable to case involving any number of routers as long as a group of routers on the transfer route can process the packet encryption scheme selected by the packet transmission source (router 71).

Note also that, the processing scheme for decrypting and re-encrypting only the packet processing key Kp according to the present invention is equally applicable to a case where the security router as shown in FIGS. 9A and 9B is provided between the data packet encryption gateway 4c and the data packet encryption gateway 4a of the first embodiment as shown in FIG. 2, for example, and the cipher communications are to be carried out between the data packet encryption gateway 4c and the security router as well as between the security router and the data packet encryption gateway 4a.

Moreover, the processing scheme of the present invention is also applicable to a case where a router that does not support the cipher communication exists between the gateways and/or computers that support the cipher communication, in any of the above described embodiments of FIG. 2 to FIGS. 9A and 9B. For example, the processing scheme of the present invention is applicable to a case where a router that does not support the cipher communication exists within the external network in FIG. 2, or a case where a router that does not support the cipher communication exists between the security router 71 and the security router 72 that support the cipher communication in FIGS. 9A and 9B.

Referring now to FIGS. 10A and 10B to FIG. 16, the third embodiment of the present invention will be described in detail.

First, the main features of this third embodiment will be outlined.

For a communication system supporting the packet transfer to the mobile computer based on the encapsulation and the security based on the packet encryption, it is possible to consider various system realization schemes depending on the system requirements. For this reason, there can be even a system in which the encapsulation processing and the packet encryption processing are executed in an arbitrary order. In other words, there can be cases where the order in which the encapsulation processing and the packet encryption processing are executed cannot be ascertained in advance at a side of the device for receiving the packet.

For example, as described in the first embodiment, in a case of using a function for eliminating a need to decrypt and re-encrypt the entire packet at the gateway by providing a part of the home agent functions to the gateway 4a or by integrating the gateway 4a with the home agent 5, the gateway 4a decrypts the packet processing key encoded within the packet by using the master key shared between the gateways 4a and 4c and then re-encrypts the packet processing key by using another master key shared between the gateway 4a and the mobile computer 2, and encapsulates the entire packet in order to make it destined to a current location of the mobile computer 2 and then transfers the resulting packet.

Thus, in contrast to the conventional case as shown in FIG. 1 in which the above described function is not used, where the processing is carried out in an order of: the encapsulation at the home agent → the encryption at the gateway, a case of using the above described function requires the processing to be carried out in an order of: the re-encryption of only the packet processing key → the encapsulation of the entire packet, which is the opposite of the conventional case.

The encapsulation processing and the encryption processing with respect to the packet at the transmitting side can be carried out in an arbitrary order and this order cannot be ascertained in advance (or immediately) at the mobile computer side, in a case where the above described gateway switches a use and a non-use of the above described function semi-fixedly or dynamically from a viewpoint of some receiving side mobile computer, or in a case where the configuration of the home network side is changed by replacing a gateway not having the above described function with a gateway having the above described function, or else depending on a positional relationship among elements constituting the system. Consequently, it is desirable for the receiving side mobile computer to have a function that enables the recovery of the original packet correctly regardless of the order by which the packet processing is carried out at the transmitting side.

To this end, in the mobile computer of this third embodiment, the outermost packet format of the received packet is judged and the execution order of the processing for decapsulating the encapsulated packet destined to the mobile computer and the processing for decrypting the encrypted packet is determined according to the judgement result. Then, the packet processing is carried out in this determined execution order, so as to recover the transmitted original packet.

By means of this function of the mobile computer, even when the encapsulation processing and the encryption processing are executed in an arbitrary order with respect to the mobile computer, it is possible for the mobile computer to recover the content correctly. In addition, the mobile computer system configuration can be simplified and the packet encryption processing can be optimized, so that it is also possible to contribute to the improvement of the system performance.

Note that the packet encapsulation scheme with respect to the mobile computer to be used here can be the IP-in-IP encapsulation as proposed in IETF RFC 2003, or the Minimal encapsulation as proposed in IETF RFC 2004, for example. Also, the packet encryption scheme to be used here can be a scheme combining a combination of the Authentication Header (AH) and the Encapsulated Security Payload (ESP) as proposed in IETF RFC 1825–1827, for example, with the SKIP key management scheme (as disclosed in A. Aziz, et al.: "Simple Key-Management for Internet Protocols (SKIP)", Internet-Draft draft-ietf-ipsec-skip-06.txt, for example).

As for the information to be used in judging the outermost packet format of a packet, it is possible to use a protocol type defined by the above noted schemes which is to be described within a header, for example.

Now, with references to the drawings, this third embodiment will be described in further detail.

Here, an exemplary case of a network having a basic configuration as shown in FIG. 1 will be described. In FIG. 1, a home network 1a and external networks 1b and 1c are inter-connected through the Internet. The networks 1a and 1c are provided with data packet encryption gateways 4a and 4c, respectively, for the purpose of carrying out cipher communications between computers managed by these networks 1a and 1c. In addition, in this third embodiment, a mobile computer 2 also has a packet encryption function similar to the data packet encryption gateways 4a and 4c. The cipher communications are to be carried out among these data packet encryption gateways 4a and 4c and the mobile computer 2.

Here, the mobile computer 2 which has a prescribed location within the network 1a as a home position is assumed to be currently located in the network 1b as a result of moving. Also, a correspondent host 3 that carries out the cipher communications with the mobile computer 2 is assumed to be located in the network 1c.

A home agent (HA) 5 within the home network 1a carries out the management of a location information of the mobile computer 2 and the routing of a packet destined to the mobile computer 2. When the mobile computer 2 moves to a remote visited site by leaving the home network 1a, a registration message containing a location information of the visited site is sent to the home agent 5.

According to this information, when a data packet destined to the mobile computer 2 arrives at the home network 1a, the home agent 5 receives this packet, formats (encapsulates) the entire packet into a data packet having a current location indicated by a mobile information as a destination, and transmits this data packet. Here, it is possible to use the IP-in-IP encapsulation in which the original packet destined to the home address is to be embedded into a payload section of an IP packet, as defined by IETF RFC 2003, for example. The mobile computer 2 then receives transmitted data by receiving and decapsulating this data packet.

Now, according to this mobile computing policy, a communication will be carried out conventionally as shown in FIG. 1 in such a manner that the cipher communication is carried out between the data packet encryption gateways 4c and 4a, and a packet with its encrypted data portion decrypted by the data packet encryption gateway 4a is sent to the home agent 5, encapsulated there, and then encrypted again by the gateway 4a. Then, the cipher communication between the gateway 4a and the mobile computer 2 is carried out, and the mobile computer 2 itself decrypts the encrypted packet and decapsulates the encapsulated packet destined to the mobile computer 2. This is a function defined as Co-located Care-of address by IETF RFC 2002.

FIGS. 10A and 10B show an exemplary packet format to be used in carrying out the mobile cipher communication in this third embodiment. Here, a packet comprises a usual IP header (IPv4 header) followed by a key information header, an authentication header, an encryption header, and an encrypted data portion in a form of a mobile encapsulation section that contains an outer IP header, an inner IP header, and a payload.

In the above described system configuration, the home agent 5 carries out the encapsulation processing to make a packet destined to the mobile computer 2, and then the gateway 4a encrypts this packet. Consequently, the encrypted data portion is formed by an IP packet destined to the mobile computer which is encapsulated by the IP-in-IP encapsulation (the mobile encapsulation section of FIG. 10A). Namely, a packet obtained by encrypting an inner packet in the IP-in-IP format will flow over the Internet, and the mobile computer 2 is going to receive and process this packet.

Note that, in FIGS. 10A and 10B, the IPv4 header has a current location address of the mobile computer 2 as its destination and a global address of the gateway 4a as its source, while the outer IP header has a current location address of the mobile computer 2 as its destination and a global address of the home agent 5 as its source, and the inner IP header has a home address of the mobile computer 2 as its destination and a home address of the correspondent host 3 as its source.

Figure 15:
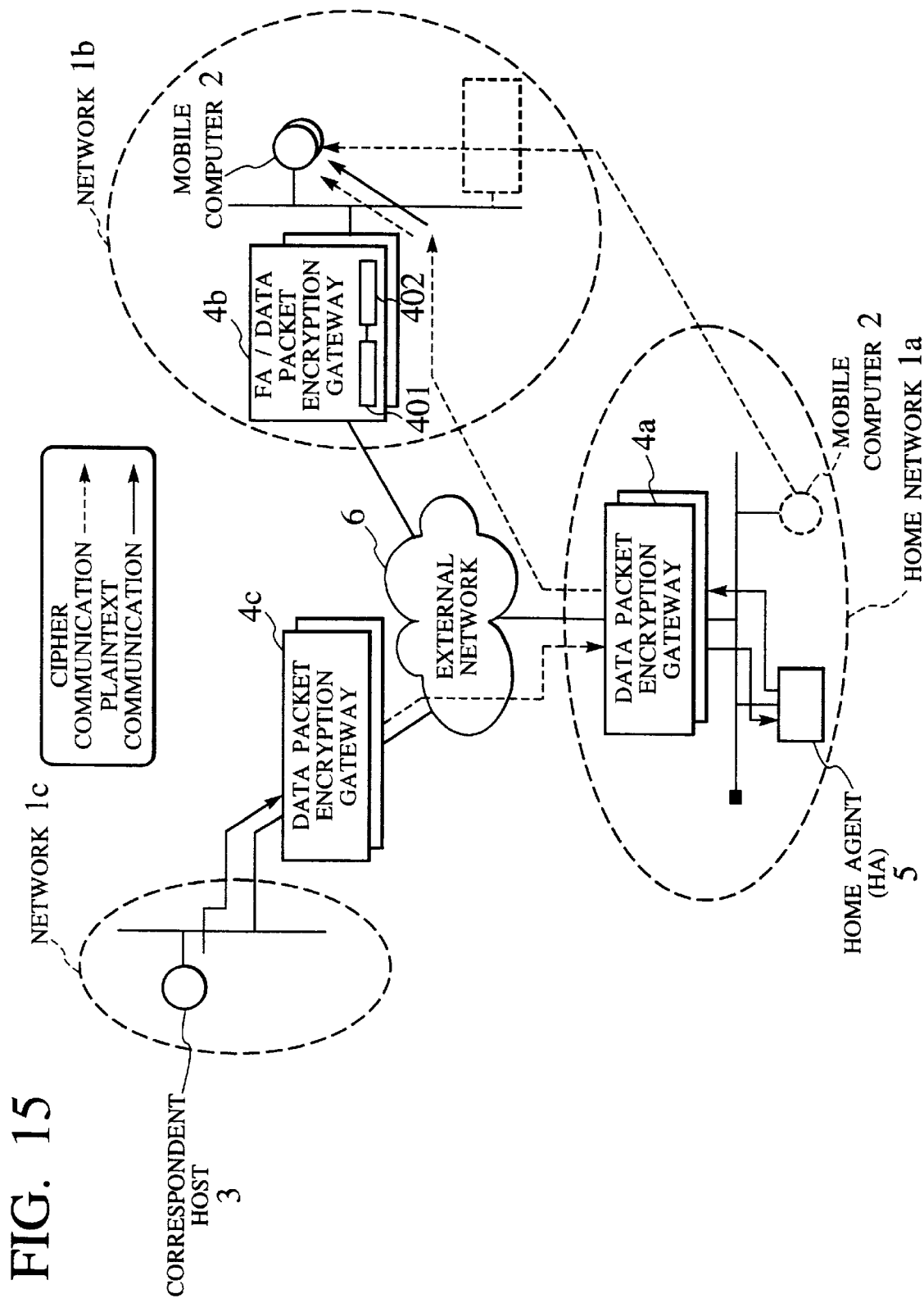
FIG. 15 is a block diagram showing still another exemplary configuration of a network system according to the third embodiment of the present invention.

Now, depending on the system requirements, it is possible to integrate the home agent 5 and the encryption gateway 4a of FIG. 15 or to implement a part of the functions of the home agent 5 in the encryption gateway 4a. The latter case is already described in the first embodiment, so that the former case will now be described.

In a case of integrating the home agent 5 and the encryption gateway 4a, it is possible to realize the optimization for omitting a need to execute the encryption processing twice in a manner of: the decryption at the encryption gateway 4a → the processing at the home agent → the re-encryption, for example.

The key information header within the packet contains information for specifying a key encryption algorithm, a packet encryption algorithm, and an authentication algorithm, as well as a packet processing key Kp encrypted by a master key Kij to be shared between two data packet encryption gateways. Here, the packet processing key Kp is a key which is randomly generated at the sender side, which will be used in calculating a packet authentication key A_Kp and a packet encryption key E_Kp.

Note that, as long as the packet processing key Kp is the same, there is no need to change the encrypted data portion or the authentication code even when the end-node of the cipher communication is changed, and only the master key Kij will be changed as a result of changing the end-node so that it suffices to decrypt and re-encrypt a portion where the packet processing key Kp is encrypted by using the master key Kij.

Figure 11:
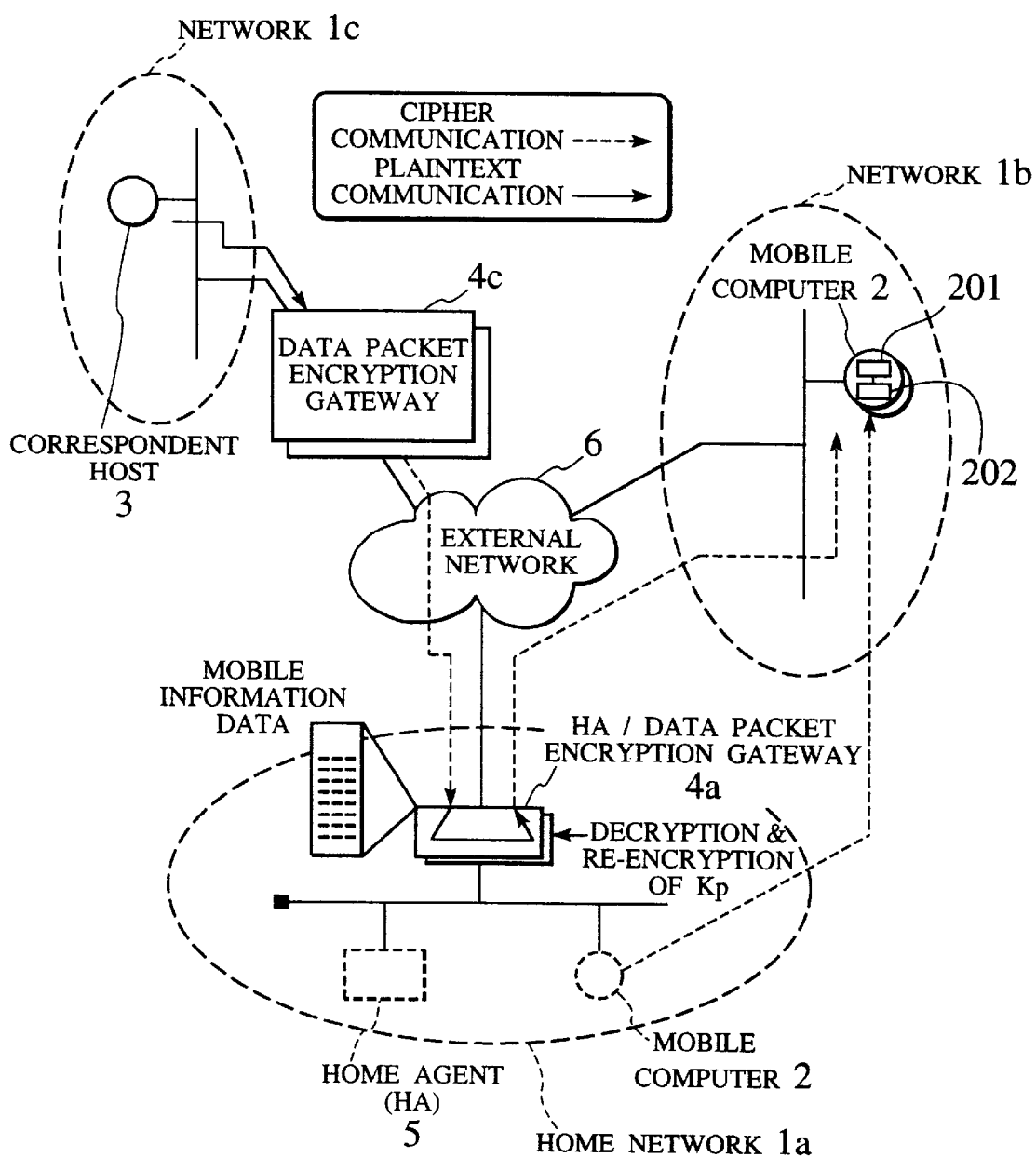
FIG. 11 is a block diagram showing an exemplary configuration of a network system according to the third embodiment of the present invention.

FIG. 11 shows an exemplary configuration in which the home agent 5 is integrated into the gateway 4a according to this policy. Here, it is assumed that the foreign agent is not to be used.

In FIG. 11, the data packet encryption gateway 4a of the home network 1a carries out the decryption of the packet processing key Kp and the re-encryption by using the master key shared between the gateway 4a and the mobile computer 2, as well as the encapsulation processing of data with respect to the mobile computer 2 which is originally carried out by the home agent 5. When data destined to the home address of the mobile computer 2 is received, the data packet encryption gateway 4a of the home network 1a decrypts the packet processing key Kp that is encrypted by using the master key shared between the gateways 4a and 4c, and re-encrypts it by using the master key shared between the gateway 4a and the mobile computer 2. In addition, using the mobile information, the datagram is encapsulated by using a current location address of the mobile computer 2 as a header, and then transmitted.

Figure 12:
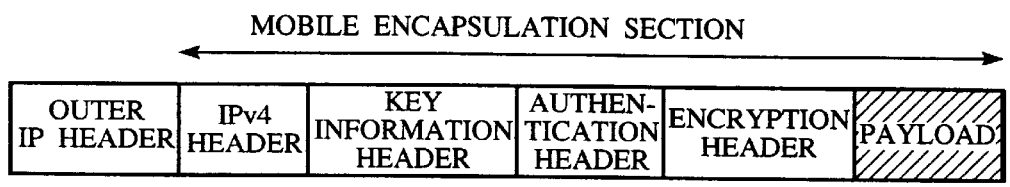
FIG. 12 is a diagram showing an exemplary data packet format that can be used in the network system of FIG. 11.

Here, the packet format is as shown in FIG. 12, where the outer side is in the mobile encapsulation format and the inner side is in the encryption format.

Note that, in FIG. 12, the IPv4 header has a current location address of the mobile computer 2 as its destination and a global address of the gateway 4a as its source, while the outer IP header has a current location address of the mobile computer 2 as its destination and a global address of the gateway 4a that also functions as the home agent as its source.

The mobile computer 2 that received this packet judges first that the format of the outer side is the mobile encapsulation format at a judging unit 201, and carries out the decapsulation followed by the encryption processing with respect to the Inner side at a packet processing unit 202. Namely, the packet is going to be processed in an order opposite to that in the system of FIG. 1.

Figure 13:
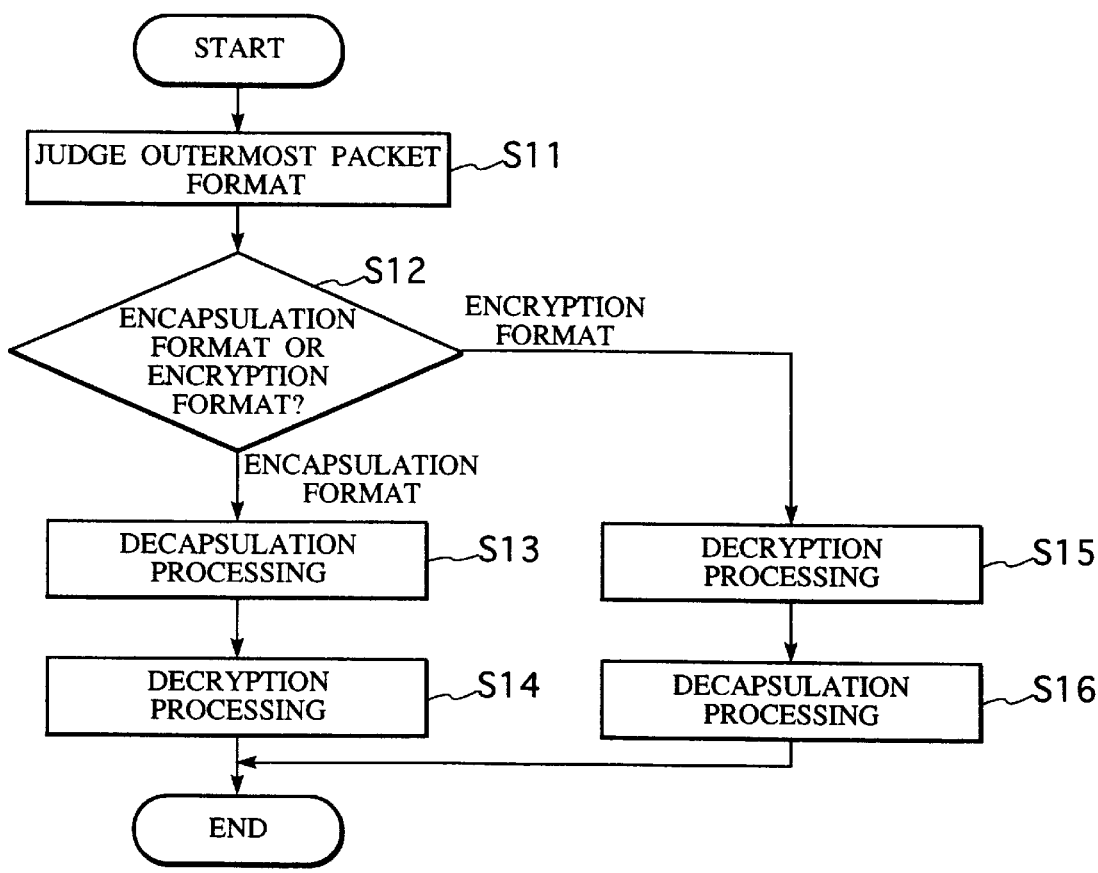
FIG. 13 is a flow chart for the operation of a mobile computer in the network system of FIG. 11.

FIG. 13 shows an exemplary procedure for the mobile computer to recover data from a received packet in a case of carrying out the packet communication supporting the encapsulation and the packet encryption.

First, the outermost packet format of a received packet is judged (step S11). For this judgement of the packet format, it is possible to use the IP protocol number or the next protocol field as defined by the mobile IP (IETF RFC 2003) or the IP security (IETF RFC 1825, etc.). For example, the IP-in-IP encapsulation format can be identified by the protocol number 4, and the encryption format can be identified by the fact that the next-header field of the IP header is a specific authentication header and encryption header identification code.

When it is judged that the outermost packet format is the encapsulation format (step S12), the decapsulation processing is carried out first (step S13), and then the decryption processing for the resulting encrypted packet is carried out (step S14).

On the other hand, when it is judged that the outermost packet format is the encryption format (step S12), the decryption processing for the encrypted packet is carried out first (step S15), and then the decapsulation processing for the resulting encapsulated packet is carried out (step S16).

Next, in analogy to the mobile computer of this third embodiment described above, the gateway according to this third embodiment will be described in detail.

Figure 14:
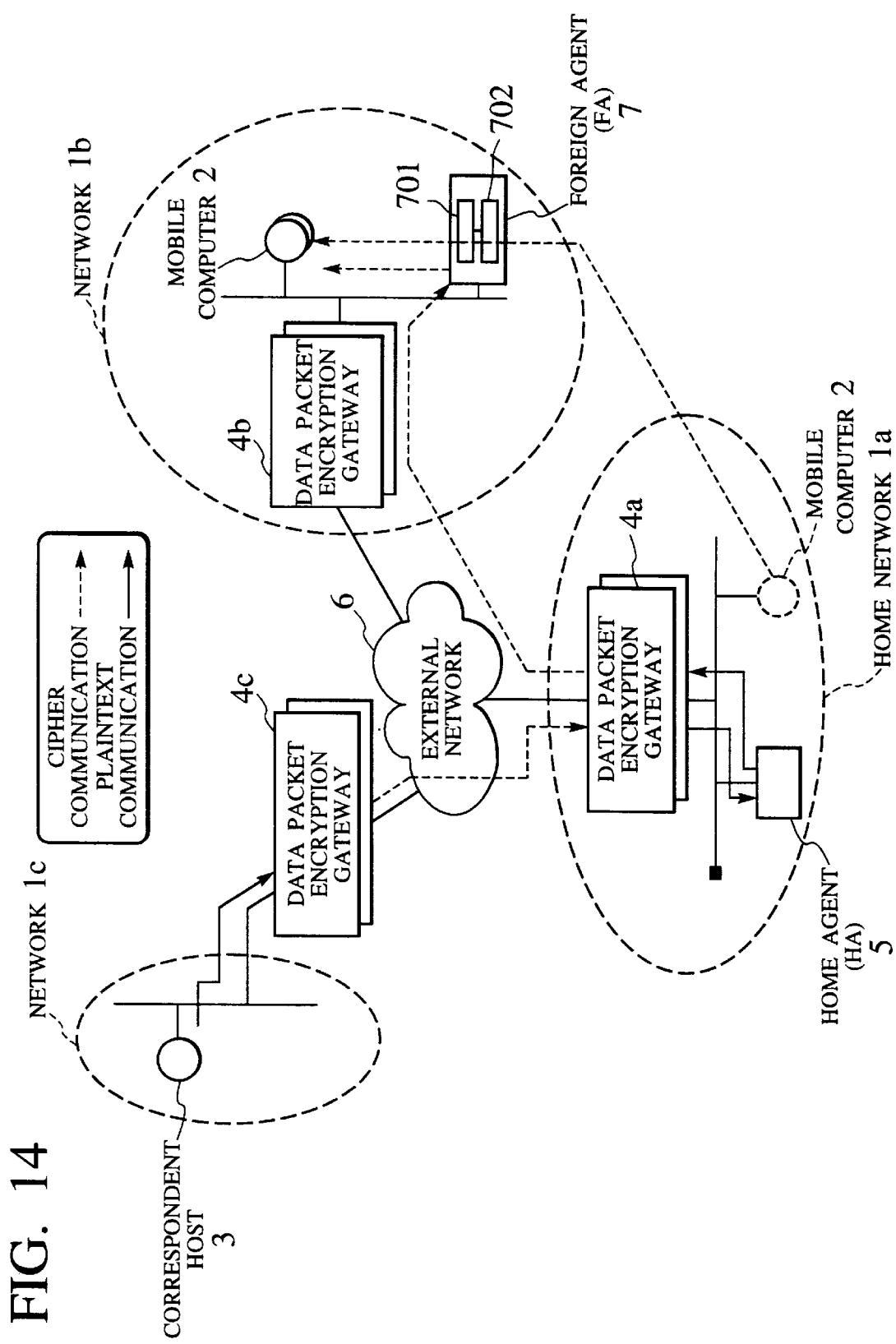
FIG. 14 is a block diagram showing another exemplary configuration of a network system according to the third embodiment of the present invention.

Here, an exemplary case of a network having a basic configuration as shown in FIG. 14 will be described. FIG. 14 differs from FIG. 1 in that a foreign agent 7 for controlling the packet delivery to the mobile computer 2 is provided within a visited network of the mobile computer 2. This foreign agent 7 is assumed to be as defined by IETF RFC 2002.

Here, the mobile computer 2 carries out the decryption of the encrypted packet while the foreign agent 7 carries out the decapsulation processing. In this case, the IP-in-IP packet processed at the home agent 5 is subsequently processed at the gateway 4a (IPsec-in-IP) and reaches to the foreign agent 7 first. The foreign agent 7 carries out the decapsulation processing first, and then the decapsulated packet is sent to the mobile computer 2 where the decryption processing is carried out.

In this system configuration of FIG. 14 which has the foreign agent 7, a packet flowing between the gateway 4a and the foreign agent 7 has a format as shown in FIG. 12 where the outer side is in the IP-in-IP encapsulation format according to the mobile IP, and the inner side is in the encryption format in which a usual IP header (IPv4 header) is followed by a key information header, an authentication header, and an encryption header. Namely, a packet in which the inner packet in the encryption format is encapsulated by the IP-in-IP encapsulation will flow over the Internet, and the foreign agent 7 is going to receive and process this packet.

Note however that, even in FIG. 14, when the encapsulation processing and the packet encryption processing are to be carried out in an arbitrary order at the transmitting side, similarly as in a case of the mobile computer described above, it is desirable for the foreign agent that carries out the packet transfer to have a function that enables the transfer processing regardless of the order by which the packet processing is carried out at the transmitting side. In such a case, the foreign agent 7 has a judging unit 701 and a packet processing unit 702 as indicated in FIG. 14.

Also, depending on the system requirements, it is possible to integrate the foreign agent 7 and the encryption gateway 4b of FIG. 14, as shown in FIG. 15.

Similarly as described above, in this case, when the encapsulation processing and the packet encryption processing are to be carried out in an arbitrary order at the transmitting side, it is also desirable for the data packet encryption gateway 4b incorporating a function of the foreign agent that carries out the packet transfer to have a function that enables the transfer processing regardless of the order by which the packet processing is carried out at the transmitting side. In such a case, the gateway 4b has a judging unit 401 and a packet processing unit 402 as indicated in FIG. 15.

Figure 16:
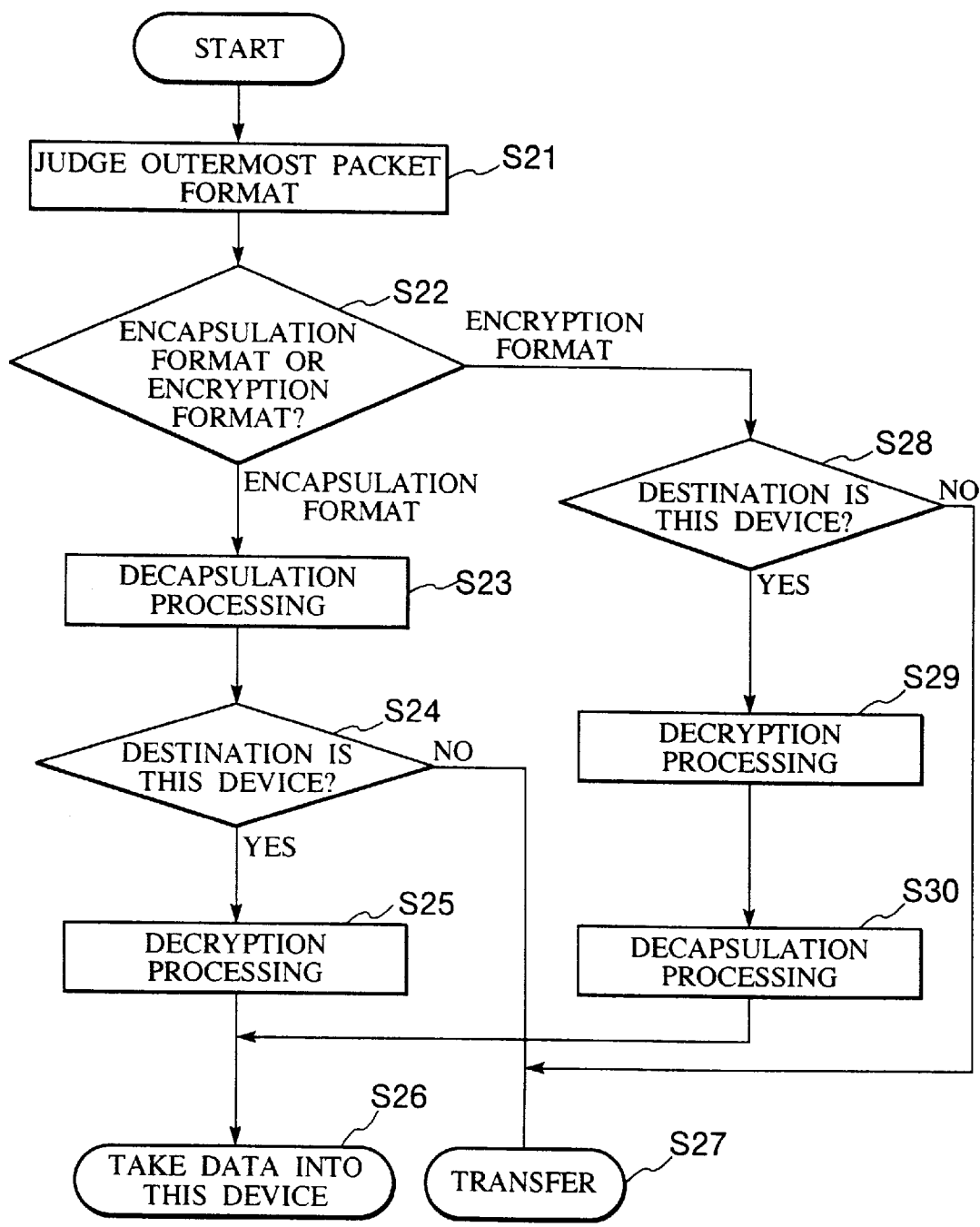
FIG. 16 is a flow chart for the operation of a foreign agent in the network system of FIG. 14 or a data packet encryption gateway having a foreign agent function in the network system of FIG. 15.

FIG. 16 shows an exemplary procedure for the foreign agent or the data packet encryption gateway having a function of the foreign agent to transfer a packet to the mobile computer in a case of carrying out the packet transfer supporting the encapsulation and the packet encryption.

First, the outermost packet format of a received packet is judged by the judging unit 701 or 401 (step S21). For this judgement of the packet format, It is possible to use the IP protocol number or the next protocol field as defined by the mobile IP (RFC 2003) or the IP security (RFC 1825, etc.). For example, the IP-in-IP encapsulation format can be identified by the protocol number 4, and the encryption format can be identified by the fact that the next-header field of the IP header is a specific authentication header and encryption header identification code.

When it is judged that the outermost packet format is the encapsulation format (step S22), the decapsulation processing is carried out first by the packet processing unit 702 or 402 (step S23). Then, the destination of the resulting encrypted packet Is checked (step S24), and when the destination is this device, the decryption processing is carried out by the packet processing unit 702 or 402 (step S25). Then, the data is taken into this device (step S26) and the other necessary processing is carried out. When the destination is the mobile computer 2, the encrypted packet is transferred to the mobile computer 2 by the packet processing unit 702 or 402 (step S27).

On the other hand, when It is judged that the outermost packet format is the encryption format (step S22), the destination of the outer side encrypted packet is checked (step S28), and when the destination is this device, the decryption processing is carried out first by the packet processing unit 702 or 402 (step S29), and then the decapsulation processing for the inner side mobile encapsulated packet is carried out by the packet processing unit 702 or 402 (step S30). When the destination of the outer side encrypted packet is the mobile computer 2, the entire packet is transferred to the mobile computer 2 as it is by the packet processing unit 702 or 402 (step S27).

Note that, in this case, the mobile computer 2 carries out the decryption processing first, and when the resulting packet is the encapsulated one, the decapsulation processing is carried out next.

Here, depending on the policies of the networks, there can be cases in which it Is allowed to transfer the non-encrypted plaintext packet between the foreign agent 7 and the mobile computer 2 of FIG. 14 or between the gateway 4b and the mobile computer 2 of FIG. 15. In such a case, it is also possible for the foreign agent 7 of FIG. 14 or the gateway 4b of FIG. 15 to carry out the decryption processing for the encrypted packet as well, on behalf of the mobile computer 2. In this case, the procedure is the same as that of FIG. 13 described above, and the judging unit 701 and the packet processing unit 702 of the foreign agent 7 or the judging unit 401 and the packet processing unit 402 of the gateway 4b function similarly to the judging unit 201 and the packet processing unit 202 of the mobile computer 2 of FIG. 11.

As described, according to the present invention, the packet processing device decrypts and re-encrypts only the packet processing key and transfers the resulting packet to the destination mobile computer, without carrying out a prescribed processing with respect to the data portion of the encrypted packet transferred thereto, so that it becomes possible to reduce the overhead of the packet processing compared with a conventional case of carrying out the prescribed processing with respect to the data portion for the entire packet.

Also, according to the present invention, the packet processing device decrypts and re-encrypts only the packet processing key and transfers the resulting packet to the destination mobile computer when the received packet is destined to the mobile computer outside the network under its management, so that it becomes possible to reduce the overhead of the packet processing compared with a conventional case of carrying out the prescribed processing with respect to the data portion for the entire packet.

Also, according to the present invention, even when the packet transfer to the mobile computer based on the encapsulation and the security based on the packet encryption are realized in an arbitrary order at the transmitting side because of a positional relationship among elements constituting the system or the system requirements such as the optimization of the packet processing, the receiving side mobile computer judges the outermost packet format of the received packet, and carries out the decapsulation processing and the decryption processing in an appropriate order, so that it is possible to recover the transmitted original packet. As a result, the mobile computer system configuration can be simplified and the packet encryption processing can be optimized, so that it is also possible to contribute to the improvement of the system performance.

It is to be noted that the present invention is applicable not only to the mobile IP and the IP security protocol as defined by IETF RFC 2002–2004 and IETF RFC 1825–1829 as described above but also to any other mobile computing protocol, cipher communication protocol, and encryption key exchange protocol.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the gateway and the mobile computer in any of the above described configurations can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet processing device for relating encrypted packets and functioning to transfer a packet received from one computer located outside a first network managed by said packet processing device to another computer having a home position within the first network and being currently moved outside the first network, said packet processing device comprising:

a receiving unit for receiving a packet transferred to said packet processing device, the packet having a packet processing key to be used in a prescribed packet processing with respect to a data portion of the packet, the packet processing key being encrypted by using a first master key shared between a last device that applied a cipher communication related processing to the packet and said packet processing device and encoded within the packet;

a decryption unit for decrypting the packet processing key encoded within the packet received by the receiving unit, without carrying out the prescribed packet processing with respect to the data portion of the packet;

an encryption unit for re-encrypting the packet processing key decrypted by the decryption unit, by using a second master key shared between a next device to apply the cipher communication related processing to the packet and said packet processing device, and encoding the packet processing key in a re-encrypted form within the packet;

a transmission unit for transmitting the packet with the packet processing key encoded therein by the encryption unit, toward a destination of the packet;

a communication unit for communicating with a mobile computer management device and transferring a packet destined to a mobile computer currently being moved outside the first network to a current location of the mobile computer, the mobile computer management device having functions for managing information on the current location of the mobile computer having a home position within the first network; and a memory unit for storing said information managed by the mobile computer management device;

wherein the receiving unit receives the packet transferred from a corresponding computer of the mobile computer, and the transmission unit transmits the packet with the packet processing key encoded therein by the encryption unit, toward the mobile computer, according to said information stored in the memory unit.

2. The packet processing device of claim 1, wherein the transmission unit encapsulates the packet with the packet processing key encoded therein by the encryption unit within an encapsulating packet destined to an address of the current location of the mobile computer, and transmits the encapsulating packet with the packet encapsulated therein, according to said information stored in the memory unit.

3. The packet processing device of claim 1, further comprising:

a recognition unit for recognizing whether the mobile computer is located outside the own network or not and whether the correspondent computer is located outside the own network or not;

wherein the decryption unit, the encryption unit, and the transmission unit are operated when both of the mobile computer and the correspondent computer are recognized as located outside the own network by the recognition unit.

4. The packet processing device of claim 3, wherein when only one of the mobile computer and the correspondent computer is recognized as located outside the own network by the recognition unit, the packet as a whole is decrypted by the decryption unit and transmitted by the transmission unit toward the mobile computer in a case where the packet enters from outside the own network into inside the own network, and the packet as a whole is encrypted by the encryption unit and transmitted by the transmission unit toward the mobile computer in a case where the packet goes out from inside the own network to outside the own network.

5. The packet processing device of claim 3, wherein the recognition unit recognizes that both of the mobile computer and the correspondent computer are located outside the own network by referring to a database of an information indicating computers which are processing targets of said packet processing device.

6. The packet processing device of claim 1, wherein the packet processing key is to be used in the prescribed packet processing for generating a packet encryption key to be used in encrypting/decrypting the data portion of the packet and a packet authentication key to be used in generating an authentication code of the packet.

7. The packet processing device of claim 1, further comprising:
   a judging unit for judging an outermost packet format of a received packet; and
   a packet processing unit for executing a decapsulation processing and a decryption processing with respect to the received packet in an order determined according to the outermost packet format judged by the judging unit.

8. The packet processing device of claim 7, wherein the packet processing unit executes the decapsulation processing first and the decryption processing next when the judging unit judges that the outermost packet format is an encapsulation format, or the decryption processing first and the decapsulation processing next when the judging unit judges that the outermost packet format is an encryption format.

9. The packet processing device of claim 7, wherein the judging unit judges the outermost packet format according to an identification information indicating a packet format which is described within a packet header of the received packet.

10. The packet processing device of claim 1, further comprising:
    a judging unit for judging an outermost packet format of a received encapsulated and encrypted packet; and
    a packet processing unit for executing a decapsulation processing on the received encapsulated and encrypted packet and transferring a resulting encrypted packet to said another computer when the judging unit judges that the outermost packet format is an encapsulation format, or transferring the received encapsulated and encrypted packet to said another computer when the judging unit judges that the outermost packet format is an encryption format.

11. The packet processing device of claim 10, wherein the judging unit judges the outermost packet format according to an identification information indicating a packet format which is described within a packet header of the received packet.

12. A packet transfer method for relaying encrypted packets at a packet processing device to transfer a packet received from one computer located outside a first network managed by said packet processing device to another computer having a home position within the first network and currently being moved outside the first network, the method comprising the steps of:
    receiving a packet transferred to said packet processing device, the packet having a packet processing key to be used in a prescribed packet processing with respect to a data portion of the packet, the packet processing key being encrypted by using a first master key shared between a last device that applied a cipher communication related processing to the packet and said packet processing device and encoded within the packet;
    decrypting the packet processing key encoded within the packet received by the receiving step, without carrying out the prescribed packet processing with respect to the data portion of the packet;
    re-encrypting the packet processing key decrypted by the decrypting step, by using a second master key shared between the next device to apply the cipher communication related processing to the packet and said packet processing device, and encoding the packet processing key in a re-encrypted form within the packet;
    transmitting the packet with the packet processing key encoded therein by the re-encrypting step, toward a destination of the packet;
    communicating with a mobile computer managed device and transferring a packet destined to a mobile computer that is currently moved outside the first network to a current location of the mobile computer, the mobile computer management device having functions for managing information on the current location of the mobile computer that has a home position within the first network; and
    storing said information managed by the mobile computer management device in a memory of said packet processing device;
    wherein the receiving step receives the packet transferred from a corresponding computer of the mobile computer, and the transmitting step transmits the packet with the packet processing key encoded therein by the encrypting step, toward the mobile computer, according to said information stored in the memory of said packet processing device.

13. The packet transfer method of claim 12, wherein the transmitting step encapsulates the packet with the packet processing key encoded therein by the re-encrypting step within an encapsulating packet destined to an address of the current location of the mobile computer, and transmits the encapsulating packet with the packet encapsulated therein, according to said information stored in the memory of said packet processing device.

14. The packet transfer method of claim 12, further comprising the steps of:
    recognizing whether the mobile computer is located outside the own network or not and whether the correspondent computer is located outside the own network or not;
    wherein the decrypting step, the re-encrypting step, and the transmitting step are executed when both of the mobile computer and the correspondent computer are recognized as located outside the own network by the recognizing step.

15. The packet transfer method of claim 14, wherein when only one of the mobile computer and the correspondent computer is recognized as located outside the own network by the recognizing step, the packet as a whole is decrypted and transmitted toward the mobile computer in a case where the packet enters from outside the own network into inside the own network, and the packet as a whole is encrypted and transmitted toward the mobile computer in a case where the packet goes out from inside the own network to outside the own network.

16. The packet transfer method of claim 14, wherein the recognizing step recognizes that both of the mobile computer and the correspondent computer are located outside the own network by referring to a database of an information indicating computers which are processing targets of said packet processing device.

17. The packet transfer method of claim 12, wherein the packet processing key is to be used in the prescribed packet processing for generating a packet encryption key to be used in encrypting/decrypting the data portion of the packet and a packet authentication key to be used in generating an authentication code of the packet.

18. The packet transfer method of claim 12, further comprising the steps of:

judging an outermost packet format of the received packet; and executing a decapsulation processing and a decryption processing with respect to the received packet in an order determined according to the outermost packet format judged by the judging step.

19. The packet processing method of claim 18, wherein the executing step executes the decapsulation processing first and the decryption processing next when the judging step judges that the outermost packet format is an encapsulation format, or the decryption processing first and the decapsulation processing next when the judging step judges that the outermost packet format is an encryption format.

20. The packet processing method of claim 18, wherein the judging step judges the outermost packet format according to an identification information indicating a packet format which is described within a packet header of the received packet.

21. The packet transfer method of claim 12, further comprising the steps of:

judging an outermost packet format of a received encapsulated and encrypted packet; and executing a decapsulation processing on the received encapsulated and encrypted packet and transferring a resulting encrypted packet to said another computer when the judging step judges that the outermost packet format is an encapsulation format, or transferring the received encapsulated and encrypted packet to said another computer when the judging step judges that the outermost packet format is an encryption format.

22. The packet transfer method of claim 21, wherein the judging step judges the outermost packet format according to an identification information indicating a packet format which is described within a packet header of the received packet.

23. A computer usable medium having computer readable program code embodied therein for causing a computer to function as a packet processing device for relating encrypted packets and functioning to transfer a packet received from one computer located outside a first network managed by said packet processing device to another computer having a home position within the first network and currently being moved outside the first network, the computer readable program code including:

a first computer readable program code for causing said computer to receive a packet transferred to said packet processing device, the packet having a packet processing key to be used in a prescribed packet processing with respect to a data portion of the packet, the packet processing key being encrypted by using a first master key shared between a last device that applied a cipher communication related processing to the packet and said packet processing device and encoded within the packet;

a second computer readable program code for causing said computer to decrypt the packet processing key encoded within the packet received by the first computer readable program code, without carrying out the prescribed packet processing with respect to the data portion of the packet;

a third computer readable program code for causing said computer to re-encrypt the packet processing key decrypted by the second computer readable program code, by using a second master key shared between a next device to apply the cipher communication related processing to the packet and said packet processing device, and encoding the packet processing key in a re-encrypted form within the packet;

a fourth computer readable program code for causing said computer to transmit the packet with the packet processing key encoded therein by the third computer readable program code, toward a destination of the packet;

a fifth computer readable program code for causing said computer to communicate with a mobile computer management device and transfer a packet destined to a mobile computer currently being moved outside the first network to a current location of the mobile computer, the mobile computer management device having functions for managing information on the current location of the mobile computer which has a home position within the first network; and a sixth computer readable program code for causing said computer to store said information managed by the mobile computer management device;

wherein the first computer readable program code receives the packet transferred from a correspondent computer of the mobile computer, and the fourth computer readable program code transmits the packet with the packet processing key encoded therein by the third computer readable program code, toward the mobile computer, according to said information stored by the sixth computer readable program code.

24. The computer usable medium of claim 23, wherein the computer readable program code further includes:

a fifth computer readable program code for causing said computer to judge an outermost packet format of a received packet; and a sixth computer readable program code for causing said computer to execute a decapsulation processing and a decryption processing with respect to the received packet in an order determined according to the outermost packet format judged by the fifth computer readable program code.

25. The computer usable medium of claim 23, wherein the computer readable program code further includes:

a fifth computer readable program code for causing said computer to judge an outermost packet format of a received encapsulated and encrypted packet; and a sixth computer readable program code for causing said computer to execute a decapsulation processing on the received encapsulated and encrypted packet and transfer a resulting encrypted packet to said another computer when the fifth computer readable program code judges that the outermost packet format is an encapsulation format, or transfer the received encapsulated and encrypted packet to said another computer when the fifth computer readable program code judges that the outermost packet format is an encryption format.

* * * * *